(12) United States Patent
Jovcic

(10) Patent No.: US 9,543,842 B2
(45) Date of Patent: Jan. 10, 2017

(54) CONVERTER FOR TRANSFERRING POWER BETWEEN DC SYSTEMS

(75) Inventor: Dragan Jovcic, Aberdeen (GB)

(73) Assignee: University Court of The University of Aberdeen, Aberdeen, Aberdeenshire (GB)

( * ) Notice: Subject to any disclaimer, the term of this patent is extended or adjusted under 35 U.S.C. 154(b) by 257 days.

(21) Appl. No.: 14/127,718

(22) PCT Filed: Jun. 25, 2012

(86) PCT No.: PCT/GB2012/051486
§ 371 (c)(1),
(2), (4) Date: Mar. 3, 2014

(87) PCT Pub. No.: WO2012/176006
PCT Pub. Date: Dec. 27, 2012

(65) Prior Publication Data
US 2014/0198534 A1 Jul. 17, 2014

(30) Foreign Application Priority Data
Jun. 23, 2011 (GB) .................................. 1110644.0

(51) Int. Cl.
*H02M 3/335* (2006.01)
*H02M 7/217* (2006.01)
(52) U.S. Cl.
CPC ..... *H02M 3/33507* (2013.01); *H02M 3/33584* (2013.01); *H02M 7/217* (2013.01); *Y02B 70/1433* (2013.01)
(58) Field of Classification Search
CPC ........ H02M 3/28; H02M 3/285; H02M 3/335; H02M 7/797
(Continued)

(56) References Cited

U.S. PATENT DOCUMENTS

| 3,215,925 A | 11/1965 | Rieke |
| 4,370,703 A | 1/1983 | Risberg |
(Continued)

FOREIGN PATENT DOCUMENTS

| EP | 0024903 | 3/1981 |
| SU | 657543 | 4/1979 |
(Continued)

OTHER PUBLICATIONS

Abutbul et al.; Step-Up Switching-Mode Converter With High Voltage Gain Using a Switched-Capacitor Circuit. IEEE Transactions on Circuits and Systems, vol. 50, No. 8, Aug. 2003, pp. 1098-1102.
(Continued)

*Primary Examiner* — Jeffrey Sterrett
(74) *Attorney, Agent, or Firm* — Nixon Peabody LLP

(57) ABSTRACT

The present invention relates to a converter for transferring power between a first DC system of DC voltage $V_1$ and a second DC system of DC voltage $V_2$, the converter comprising: —a first AC/DC converter for transforming DC voltage $V_1$ into a first single phase AC voltage $V_{1ac}$, of frequency $\omega$, root mean square line-neutral magnitude $V_{1acm}$ and angle $\alpha_1$; a second AC/DC converter for transforming DC voltage $V_2$ into a second single phase AC voltage $V_{2ac}$, of frequency $\omega$, root mean square line-neutral magnitude $V_{2acm}$ and angle $\alpha_2$; and two inductors $L_1$, $L_2$ and a capacitor C, wherein the first terminals of the inductors and capacitor are connected together, the second terminal of inductor $L_1$ and the second terminal of the capacitor C are connected to the first AC voltage $V_{1ac}$, and the second terminal of inductor $L_2$ and the second terminal of the capacitor C are connected to the second AC voltage $V_{2ac}$; wherein the value of the capacitor C, inductor $L_1$ and inductor $L_2$ are selected
(Continued)

to enable required power transfer and to minimize current in inductor $L_1$, and/or minimize current in inductor $L_2$.

26 Claims, 11 Drawing Sheets

(58) Field of Classification Search
USPC ..... 363/15, 16, 17, 123, 125, 127, 131, 132, 363/135, 136, 137
See application file for complete search history.

(56) References Cited

U.S. PATENT DOCUMENTS

| | | | |
|---|---|---|---|
| 4,426,350 | A | 1/1984 | Zegar et al. |
| 4,473,875 | A | 9/1984 | Parsons et al. |
| 5,287,261 | A | 2/1994 | Ehsani |
| 5,426,350 | A | 6/1995 | Lai |
| 5,804,949 | A | 9/1998 | Othman et al. |
| 6,243,277 | B1 | 6/2001 | Sun et al. |
| 6,429,632 | B1 | 8/2002 | Forbes et al. |
| 2004/0141345 | A1 | 7/2004 | Cheng et al. |
| 2006/0083039 | A1 | 4/2006 | Oliveira et al. |
| 2008/0013351 | A1 | 1/2008 | Alexander |
| 2011/0254379 | A1 | 10/2011 | Madawala |
| 2014/0198534 | A1* | 7/2014 | Jovcic ............... H02M 3/33584 363/16 |
| 2015/0003115 | A1* | 1/2015 | Barron .................... H02M 1/08 363/17 |
| 2015/0061569 | A1* | 3/2015 | Alexander .......... B60L 11/1809 320/101 |
| 2015/0349648 | A1* | 12/2015 | Zane ................. H02M 3/33507 363/17 |

FOREIGN PATENT DOCUMENTS

| | | |
|---|---|---|
| WO | WO2004/017151 | 2/2004 |
| WO | WO2006/051479 | 5/2006 |
| WO | WO2008/032362 | 3/2008 |
| WO | WO2009/074820 | 6/2009 |
| WO | WO2010/0029345 | 3/2010 |

OTHER PUBLICATIONS

U.S. Appl. No. 12/747,662, USPTO Office Action mail date Sep. 28, 2012, 13 pages.
U.S. Appl. No. 13/062,943, USPTO Office Action mail date May 30, 2013, 20 pages.
Borage et al. Analysis and Design of an LCL-T Resonant Converter as a Constant-Current Power Supply, IEEE Transactions on Industrial Electronics, vol. 52. No. 6, Dec. 2005, pp. 1547-1554.
Choi D. K. et al.; A novel power conversion circuit for cost-effective battery-fuel cell hybrid systems, Apr. 12, 2005, pp. 245-255.
D. Jovcic, Bidirectional, High-Power DC Transformer, IEEE Transactions on Power Delivery, vol. 24, No. 4, Oct. 2009, pp. 2276-2283.
D. Jovcic, Offshore wind farm with a series multiterminal CSI HVDC, Electric Power Systems Research 78 (2008) 747-55.
D. Jovcic, Phase Locked Loop System for Facts, IEEE Transactions on Power Systems, vol. 18, No. 3, Aug. 2003, 8 pages.
D. Jovcic, Step-Up Dc-DC Converter for Megawatt Size Applications, IET Power Electronics, 2009, vol. 2, Iss. 6, pp. 675-685.
D. Jovcic, Developing DC Transmission Networks Using DC Transformers; IEEE Transactions on Power Delivery, vol. 25, No. 4, Oct. 2010, pp. 2535-2543.
Dieckerhoff et al., Design of and IGBT-based LCL-Resonant Inverter for High-Frequency Induction Heating , IEEE (1999), pp. 2039-2045.
Dirk Van Hertem; Multi-terminal VSC HVDC for the European Supergrid: Obstacles, Renewable and Sustainable Energy Reviews 14 (2010) 3156-63.

Ericsson, Operational Experience of HVDC Light, AC-DC Power Transmission, Nov. 28-30, 2001, pp. 205-210.
Flourentzou, VSC-Based HVDC Power Transmission System: An Overview, IEEE Transactions on Power Electronics, vol. 24, No. 3, Mar. 2009, pp. 592-602.
Gang et al. A novel soft switching Bi-directional DC/DC Converter, https://app.box.com/shared/rf8k27qriof3vnj493y1, pp. 1075-1079.
Hafner; Proactive Hybrid HVDC Breakers—A key innovation for reliable HVDC grids (2011), 9 pages.
International Preliminary Report on Patentability, PCT/GB2008/051141, mail date Jun. 24, 2010, 9 pages.
International Preliminary Report on Patentability, PCT/GB2009/051141, mail date Mar. 24, 2011, 8 pages.
International Search Report, PCT/GB2008/051141, mail date Mar. 11, 2009, 18 pages.
International Search Report, PCT/GB2009/051141, mail date Dec. 28, 2009, 13 pages.
International Preliminary Report on Patentability, PCT/GB2012/051486, mail date Jan. 9, 2014, 6 pages.
International Search Report, PCT/GB2012/051486, mail date Nov. 6, 2012, 11 pages.
J Robinson, D Jovcic and G Joos; Analysis and Design of an Offshore Wind Farm Using a MV DC Grid, IEEE Transactions on Power Delivery (2010); 10 pages.
K. Hirachi, Circuit Configuration of Bidrectional DC/DC Converter Specific for Small Scale Load Leveling System, IEEE (2002), pp. 603-609.
Kassakian, High-Frequency High-Density Converters for Distributed Power Supply Systems, IEEE, vol. 76, No. 4, Apr. 1988, pp. 362-376.
L. Heinemann, Analysis and design of a modular, high power converter with high efficiency for electrical power distribution systems, IEEE (2002), pp. 713-718.
Laszlo Huber et al.; A Design Approach for Server Power Supplies for Networking Applications, IEEE (2000), pp. 1163-1169.
Li et al.; A Natural ZVS High-power Bi-Directional dc-dc Converter with Minimum Number of Devices, IEEE dated Sep. 30, 2001, pp. 1874-1881.
Mehrdad Ehsani; Power Converters as Natural Gyrators, IEEE Transactions on Circuits and Systems, Dec. 1, 1993, pp. 946-949.
Ranganathan; A Regulated DC-DC Voltage Source Converter Using a High Frequency Link; IEEE Transactions on Industry Applications, vol. IA-18, No. 3, May/Jun. 1982, pp. 279-287.
Reimann et al.; A Novel Control Principle of Bi-Directional DC-DC Power Conversion, IEEE Jun. 22, 1997, pp. 978-984.
Rong-Jong Wai, High Step-up Converter With Coupled-Inductor, IEEE Transactions on Power Electronics, vol. 20, No. 5, Sep. 2005, pp. 1025-1035.
Sean Loddick; Active Stator, A New Generator Topology for Direct Drive Permanent Magnet Generators, AC and DC Power Transmission, 2010. ACDC. 9th IET International Conference, 5 pages.
Sharma; Low Cost High Efficiency DC-DC Converter for Fuel Cell Powered Auxiliary Power Unit of a Heavy Vehicle, IEEE Transactions on Power Electronics, vol. 21, No. 3, May 2006, pp. 587-591.
UK Search Report, Application No. GB0724369, mail date May 30, 2008, 3 pages.
Zhao, High-Efficiency, High Step-Up DC-DC Converters, IEEE Transactions on Power Electronics, vol. 18, No. 1, Jan. 2003, pp. 65-73.
Dasgupta, S. et al. "A Plug and Play Operational Approach for Implementation of an Autonomous-Micro-Grid System." IEEE Transactions on Industrial Informatics. vol. 8, No. 3, Aug. 2012 (15 pages).
Liu, Q. et al. "Improved Droop Control for Parallel Inverters in Microgrids." 2012 International Power Electronics and Motion Control Conference. Jun. 2, 2012, pp. 2277-2281 (4 pages).
Wang, X. et al. "An Improved Design of Virtual Output Impedance Loop for Droop-Controlled Parallel Three-Phase Voltage Source Inverters." 2012 IEEE Energy Conversion Congress and Exposition. Sep. 15, 2012, pp. 2466-2473 (8 pages).
Zhang, X. et al. "Proportional Load Sharing Method for Parallel Connected Inverters." 2010 IEEE International Symposium on Industrial Electronics (ISIE). Jul. 4, 2010, pp. 2261-2265 (5 pages).

(56) References Cited

OTHER PUBLICATIONS

International Search Report and Written Opinion mailed Mar. 18, 2015, which issued in International Patent Application No. PCT/GB2014/050416 (13 pages)

* cited by examiner $\alpha_1$ — phase angle of AC voltage
$\gamma_1$ — conduction angle of AC voltage
$V_{1ace}$ — AC voltage (actual square waveform)
$V_1$ — magnitude of DC voltage
$V_{1ac}$ — fundamental component of AC voltage
$V_{1acmm}$ — peak magnitude of AC voltage $V_{1ac}$ $V_{1ac} = V_{cx}$
$V_{2ac} = jV_{cy}$
$I_{1ac} = -V_{2ac}/(\omega L_1)$
$I_{2ac} = -jV_{1ac}/(\omega L_2)$

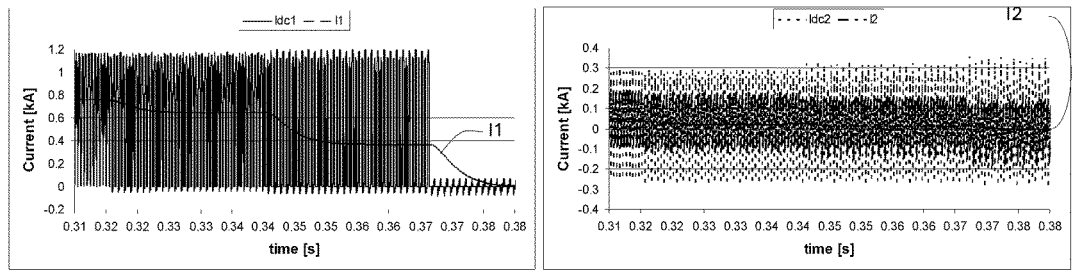
Figure 5c.
Figure 5d.
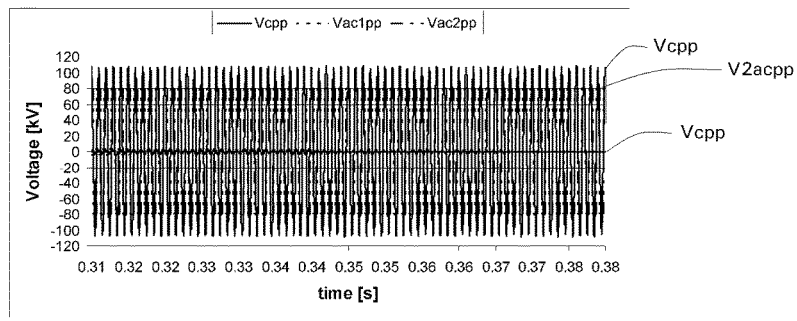
Figure 5e.
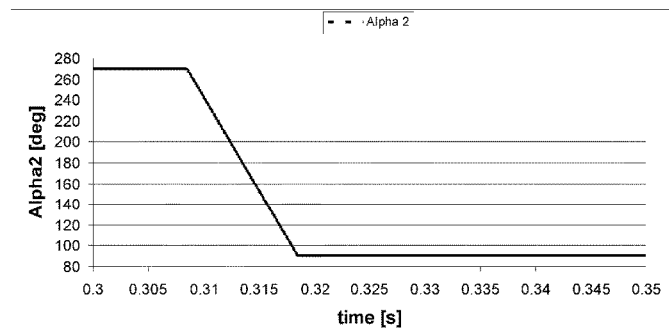
Figure 6a.

CONVERTER FOR TRANSFERRING POWER BETWEEN DC SYSTEMS

This application is a U.S. national stage filing of International Application No. PCT/GB2012/051486, filed Jun. 25, 2012, which claims the benefit of Great Britain Patent Application No. 1110644.0, filed Jun. 23, 2011, the contents of these applications being incorporated entirely herein by reference.

The present invention relates to an electronic transformer for interfacing with DC transmission.

Historically, there has not been much use of DC-DC converters in the power range of tens and hundreds of MW, because of insufficient market need and the lack of suitable technology. However, the market demand for DC-DC connection has significantly increased in recent years as increasing numbers of power sources which generate DC are developed. DC power sources which approach power levels in the multiple MW range include: —fuel cells, photovoltaics, batteries and redox flow [1,2]. Additionally, variable speed machines such as permanent magnet wind generators or small hydro generators may be viewed as DC sources if the last converter stage is removed [3]. Furthermore, most electrical storage and load levelling devices use some form of DC storage media, such as, batteries, supercapacitors, capacitors, superconducting magnetic energy storage, etc). Many of these DC sources utilise very low voltage basic cell, or require wide variation of DC voltage. Consequently, their integration into the power grid has traditionally been difficult.

The rapid development of High Voltage DC (HVDC) transmission technologies is also driving demand for DC-DC converters. The recently developed HVDC light, ie HVDC with Voltage Source Converters (VSC HVDC), [4] has been implemented in many interconnections and shows many benefits compared with the traditional thyristor based HVDC. Virtually all existing HVDC schemes, both line commutated and VSC HVDC, operate as two-terminal systems. However, there is significant incentive to develop the technology to provide additional access points to the existing HVDC lines. A suitable MW size DC-DC converter would enable tapping on HVDC lines and aid development of multi-terminal HVDC. In particular, the recent development of offshore renewable sources creates the scenario of distributed DC sources with the requirement for submarine DC transmission and DC/DC voltage stepping at MW power levels.

A high-power DC transformer is needed to connect a DC transmission network with another DC network at a different DC voltage level, or to connect DC sources and loads.

DC-DC converters have been extensively utilized at low power levels, and many topologies exist. However, most low power converter technology is unsuitable for scaling up to MW power levels.

Conventional, unidirectional boost converters [5] can not achieve gains larger than 2-4, or higher powers, due to difficulties with the output diode and poor efficiency.

There have been attempts to develop converters with an internal AC transformer, for example flyback and forward converters [5-7], at higher power levels. However, some serious inherent limitations in terms of stepping ratios and power levels have been demonstrated. Reference [1] studies scaling up to 5 kW with a stepping ratio of 5, and [2] describes a 100 kW, 14 kV forward converter. However, these converters utilise MOSFETs (Metal-Oxide-Semiconductor Field-Effect Transistor) as switches with around 10 kHz frequency, which gives little prospect for further increasing to MW power levels, where IGBT (Insulated-Gate Bipolar Transistor) switches are required and lower frequency.

Parallel resonant converters can achieve high step-up gain [5]. The main limitations of these topologies are caused by increased switching losses, poor power quality, poor power factor and switch utilization, difficulties with power direction reversal and control difficulties.

Switched capacitor converters have been proposed as a method of achieving high DC boost without transformers or inductors [8]. However, each module only increases the output voltage by the value of the input voltage. Thus, to achieve a stepping ration of 10, for example, 9 modules are needed and over 18 switches. This results in significant losses and complexity.

A resonant LCLC circuit has been proposed for applications with high-frequency ballast lighting, which shows the capability of transformerless step-down operation [9]. However, such a converter is only suitable for driving a passive capacitive load (two LC circuits), and uses frequency control.

LCL-T resonant converters give improved performance at high power. However, an internal AC transformer is required to achieve voltage stepping [10]. The internal transformer increases weight and losses, and creates difficulties in the case of faults. Moreover, these converter topologies are normally used with one active bridge and one diode bridge, which precludes power reversal.

An LCL resonant converter which does not require a transformer has been proposed for an induction heating application [11]. However, this converter operates as an LCLR circuit and is only suitable for supplying a passive resistive load.

The topologies of [9,10,11] use a single active bridge and must employ a transformer for voltage stepping.

Most of the above topologies have destructive currents under DC fault conditions. DC faults are very important with high power systems because of difficulties in interrupting high fault currents.

A step-up DC-DC converter without internal voltage transformers has been proposed recently [12-15]. This converter can achieve very high step-up gains with a MW range test system, and bidirectional operation is possible. The switches on the low voltage side of this converter should be rated for $P_{12}*n_{12}$, where $P_{12}$ is the power transfer and $n_{12}$ is the stepping ratio ($n_{12}=V_1/V_2$). This represents a low switch utilisation factor with consequent disadvantages in terms of cost and increased losses. A further limiting factor of this converter is the low switching frequency caused by the use of thyristor switches, which have a long turn off time and introduce reverse recovery issues.

According to one aspect of the present invention there is provided a converter for transferring power between a first DC system of DC voltage $V_1$ and a second DC system of DC voltage $V_2$, the converter comprising: — a first AC/DC converter for transforming DC voltage $V_1$ into a first single phase AC voltage $V_{1ac}$, of frequency ω, RMS line-neutral magnitude $V_{1acm}$ and angle $α_1$;

a second AC/DC converter for transforming DC voltage $V_2$ into a second single phase AC voltage $V_{2ac}$, of frequency ω, RMS line-neutral magnitude $V_{2acm}$ and angle $α_2$; and two inductors $L_1$,$L_2$ and a capacitor C, wherein the first terminals of the inductors and capacitor are connected together, the second terminal of inductor $L_1$ and the second terminal of the capacitor C are connected to the first AC voltage $V_{1ac}$, and the second terminal of inductor $L_2$ and the second terminal of the capacitor C are connected to the second AC voltage $V_{2ac}$;

wherein the value of the capacitor C, inductor L1 and inductor L2 are selected to enable required power transfer and to minimise current in inductor L1, and/or minimise current in inductor L2, Preferably, for maximum power transfer in one direction, the converter is operated such that the difference between the AC voltage angles $\alpha_1, \alpha_2$ is substantially $$arctg\sqrt{\frac{1}{k_2 k_1} - 1} \text{ degrees}$$

and, for maximum power transfer in the opposite direction, the converter is operated such that the difference between the AC voltage angles $\alpha_1, \alpha_2$ is substantially $$180 - arctg\sqrt{\frac{1}{k_2 k_1} - 1} \text{ degrees.}$$

Thus, with the present invention, power can be transferred between DC systems without the need for an internal transformer. Moreover, any stepping ratio at low losses can be achieved, unlike other LCL converters such as those disclosed in [11]. Moreover, the converter of the invention can use faster switches such as IGBT, with turn-off capability and no reverse blocking, which represents an improvement over thyristor switches as used in previous DC/DC transformerless converters such as those disclosed in [12, 13]. Furthermore, the converter of the invention is based on a voltage-source approach, whereas previous DC/DC transformerless converters such as those disclosed in [12, 13] are based on a current source approach. Additionally, the converter of the invention achieves excellent DC fault response, which is important for high-power applications. These advantages apply equally to the other aspects of the invention defined below.

According to a second aspect of the present invention there is provided a converter for transferring power between a first DC system of DC voltage $V_1$ and a second DC system of DC voltage $V_2$, the converter comprising:

a first AC/DC converter for transforming DC voltage $V_1$ into a first p phase AC voltage $V_{1ac}$ of frequency $\omega$, RMS line-neutral magnitude $V_{1acm}$ and angle $\alpha_1$;

a second AC/DC converter for transforming DC voltage $V_2$ into a second p phase AC voltage $V_{2ac}$, of frequency $\omega$, RMS line-neutral magnitude $V_{2acm}$ and angle $\alpha_2$; and a resonant circuit for each phase p, wherein each resonant circuit comprises two inductors $L_1, L_2$ and a capacitor C connected together at their first terminals, the second terminal of inductor $L_1$ being connected to the respective phase of the first AC voltage $V_{1ac}$, and the second terminal of inductor $L_2$ being connected to the respective phase of the second AC voltage $V_{2ac}$;

wherein the value of the capacitor C, inductor $L_1$ and inductor $L_2$ are selected to satisfy:

$k_1 = 1 - \omega^2 L_2 C$ $k_2 = 1 - \omega^2 L_1 C$ $k_3 = L_1 + L_2 - \omega^2 L_1 L_2 C$ and where $k_1$ is selected in the region:

$$-\frac{V_2}{V_1} < k_1 < 1$$

and where $$k_2 = k_1 s^2$$

$$k_3 = \frac{-p 8 V_1 V_2 \sqrt{1 - (V_1/V_2)^2 k_1^2}}{P_{1ac} \omega \pi^2}$$

and where $P_{12}$ represents maximum power transfer by the converter.

Preferably, for maximum power transfer in one direction, the converter is operated such that the difference between the AC voltage angles $\alpha_1, \alpha_2$ is substantially $$arctg\sqrt{\frac{1}{k_2 k_1} - 1} \text{ degrees}$$

and, for maximum power transfer in the opposite direction, the converter is operated such that the difference between the AC voltage angles $\alpha_1, \alpha_2$ is substantially $$180 - arctg\sqrt{\frac{1}{k_2 k_1} - 1} \text{ degrees.}$$

With the second aspect of the invention, the principles of the invention are applied to a p phase converter. The number of phases p may be any positive integer, preferably 1, 2 or 3. It will be appreciated that the case where p=1 corresponds to a single phase converter, and is equivalent to the first aspect of the invention.

According to a third aspect of the present invention there is provided a converter for transferring power between n first DC systems respectively of DC voltage $V_{1i}$ (i=1, 2, ... n) and m second DC systems respectively of DC voltage $V_{2j}$ (j=1, 2, ... m), where n and m are each any positive integer, the converter comprising:

n AC/DC converters for respectively transforming DC voltages $V_{1i}$ into respective p phase AC voltages $V_{1iac}$ of frequency $\omega$, RMS line-neutral magnitude $V_{1iaCm}$ and angle $\alpha_{1i}$;

m AC/DC converters for respectively transforming DC voltages $V_{2j}$ into respective p phase AC voltages $V_{2jac}$, of frequency $\omega$, RMS line-neutral magnitude $V_{2jacm}$ and angle $\alpha_{2j}$; and a LCL circuit for each phase p, wherein each LCL circuit comprises n inductors $L_{1i}$, m inductors $L_{2j}$ and a capacitor C connected together at their first terminals, the second terminal of each inductor $L_{1i}$ being connected to the respective phase of the respective AC voltage $V_{1iac}$, and the second terminal of each inductor $L_{2j}$ being connected to the respective phase of the respective AC voltage $V_{2jac}$;

wherein wherein the value of the capacitor C, each inductor $L_{1i}$ and each inductor $L_{2j}$ are selected to enable required power transfer and to minimise current in inductors $L_{1i}$, and/or minimise currents in inductors $L_{2j}$, Preferably, for maximum power transfer in one direction, the converter is operated such that the difference between the AC voltage angles $\alpha_{1i},\alpha_{2j}$ is substantially $$arctg\sqrt{\frac{1}{k_2 k_1}-1} \text{ degrees}$$

and, for maximum power transfer in the opposite direction, the converter is operated such that the difference between the AC voltage angles $\alpha_{1i},\alpha_{2j}$ is substantially $$180 - arctg\sqrt{\frac{1}{k_2 k_1}-1} \text{ degrees.}$$

Preferably, the converter is operated such that, for power transfer, the AC voltage angle (s) $\alpha_{1i}$ is/are substantially 0 degrees; and the AC voltage angle (s) $\alpha_{2j}$ is/are substantially $$arctg\sqrt{\frac{1}{k_2 k_1}-1} \text{ degrees}$$

for maximum power transfer in one direction, and substantially $$180 - arctg\sqrt{\frac{1}{k_2 k_1}-1} \text{ degrees}$$

for maximum power transfer in the opposite direction.

With the third aspect of the invention, the principles of the invention are extended to a converter with n terminals on one side and m terminals on the other side. n and m may each be any positive integer and are not necessarily equal. It will be appreciated that if n=m=1, the third aspect of the invention is equivalent to the second aspect of the invention, and that if n=m=1 and p=1, the third aspect of the invention is equivalent to the first aspect of the invention. As with the second aspect of the invention, the number of phases p may be any positive integer, preferably 1, 2 or 3.

According to a fourth aspect of the invention, there is provided a converter for transferring power between a p phase AC system of AC voltage $V_{1ac}$ of frequency $\omega$, RMS line-neutral magnitude $V_{1acm}$ and angle $\alpha_1$ and a DC system of DC voltage $V_2$, the converter comprising: — an AC/DC converter for transforming DC voltage $V_2$ into a p phase AC voltage $V_{2ac}$, of frequency $\omega$, RMS line-neutral magnitude $V_{2acm}$ and angle $\alpha_2$; and a LCL circuit for each phase p, wherein each LCL circuit comprises two inductors $L_1, L_2$ and a capacitor C connected together at their first terminals, the second terminal of inductor $L_1$ being connected to the respective phase of AC voltage $V_{1ac}$, and the second terminal of inductor $L_2$ being connected to the respective phase of AC voltage $V_{2ac}$;

wherein the value of the capacitor C, inductor $L_1$ and each inductor $L_{2j}$ are selected to enable required power transfer and to minimise current in inductor $L_1$, and/or minimise currents in inductors $L_{2j}$.

Preferably, for maximum power transfer in one direction, the converter is operated such that the difference between the AC voltage angles $\alpha_1, \alpha_{2j}$ is substantially 270 degrees and, for maximum power transfer in the opposite direction, the converter is operated such that the difference between the AC voltage angles $\alpha_1, \alpha_2$ is substantially 90 degrees.

With the fourth aspect of the invention, the principles of the invention are extended to a converter for transferring power between an AC system and a DC system. As compared with the first and second aspects of the invention, the first AC/DC converter is omitted, and the resonant circuit associated with each phase is connected directly to the respective phase of the AC voltage source.

According to a fifth aspect of the invention, there is provided a converter for transferring power between a p phase AC system of AC voltage $V_{1ac}$ of frequency $\omega$, RMS line-neutral magnitude $V_{1acm}$ and angle $\alpha_1$, and m DC systems respectively of DC voltage $V_{2j}$ (j=1, 2, ... m), where m is any positive integer, the converter comprising: — m AC/DC converters for respectively transforming DC voltages $V_{2j}$ into respective p phase AC voltages $V_{2jac}$, of frequency $\omega$, RMS line-neutral magnitude $V_{2jacm}$ and angle $\alpha_{2j}$, and a resonant circuit for each phase p, wherein each resonant circuit comprises an inductor $L_1$, m inductors $L_{2j}$ and a capacitor C connected together at their first terminals, the second terminal of each inductor $L_1$ being connected to the respective phase of the respective AC voltage $V_{1ac}$, and the second terminal of each inductor $L_{2j}$ being connected to the respective phase of the respective AC voltage $V_{2jac}$;

wherein the value of the capacitor C, inductor $L_1$ and inductor $L_2$ are selected to enable required power transfer and to minimise currents in each inductor $L_{1i}$, and/or minimise current in inductors $L_2$ Preferably, for maximum power transfer in one direction, the converter is operated such that the difference between the AC voltage angles $\alpha_1, \alpha_{2j}$ is substantially 270 degrees and, for maximum power transfer in the opposite direction, the converter is operated such that the difference between the AC voltage angles $\alpha_1, \alpha_{2j}$ is substantially 90 degrees. [j1]

With the fifth aspect of the invention, the principles of the invention are extended to a converter for transferring power between an AC system and m DC systems, where m may be any positive integer.

In all aspects of the invention, we aim minimizing current through inductors and therefore minimizing losses and stress in the switches and inductors. This is equivalent to minimizing reactive power circulation within each side of the converter.

According to the second aspect of the invention all values of $k_1$ in the range $$-\frac{V_2}{V_1} < k_1 < 1$$

will give zero reactive current at low voltage (angle of $I_{1ac}$ is equal to angle of $V_{1ac}$) and at high voltage side (angle of $I_{2ac}$ is equal to angle of $V_{2ac}$), if other conditions are satisfied. All values for k1 in the above range imply minimal magnitude of $I_{1ac}$ and $I_{2ac}$.

The actual value for $k_1$ will depend on the other design goals. Large positive values will give small values for inductors but the switching losses will be high. The value $k_1=k_2=0$ will give best responses under DC faults but will still give large currents switching instants and switching losses. A very large negative k1 implies minimal switching losses but the dynamic stability will be poor since natural resonance mode will be close to the switching frequency.

In all aspects of the invention, the converter preferably comprises control means for controlling power flow though the converter, wherein said control means comprises: — means for varying AC voltage magnitude by changing the width of the AC pulses;

varying the angle difference between the AC sources; and/or varying the operating frequency of the converter.

Preferably, the first DC system is a low voltage system and the second DC system is a high voltage system. That is to say, $V_1$ is preferably lower than $V_2$.

The AC voltages $V_{1ac}, V_{2ac}$ of the two AC/DC converters are described as p phase AC voltages. That is, the AC/DC converters are configured to transform the respective DC voltage into an AC voltage with p phases, where p may be any positive integer value. Thus, for example, the AC voltages $V_{1ac}, V_{2ac}$ may be single phase, 2 phase, 3 phase etc.

It will be appreciated that, in the case of converters with a single terminal on each side, the inner resonant circuit of a single phase converter will comprise one $L_1$ inductor, one $L_2$ inductor and one capacitor, whilst the inner resonant circuit of a 2 phase converter will comprise two $L_1$ inductors, two $L_2$ inductors and two capacitors C, and so on. More generally, the number of inductors $L_{1i}, L_{2j}$ depends on the number of terminals on the respective side of the converter, as well as the number of phases, whereas the number of capacitors C only depends on the number of phases.

The DC/AC converters may each comprise 2p switches arranged as a bridge (or a half bridge), for transforming a DC voltage into a p phase AC voltage in known manner. Each bridge/half bridge may comprise p legs, where each leg comprises two switches, and corresponds to a different phase of the converter.

In cases where the converter has more than one phase, the second terminals of the capacitors are preferably connected to a common point, ie, in a star configuration. However, as with any other AC system, the capacitors may be connected in other configurations. For example, in delta configuration in the case of a 3 phase converter.

Where sides of the converter are referred to, this is with reference to the inner resonant circuits. In general there will be a low voltage side and a high voltage side, wherein the low voltage side is connected to a relatively low DC voltage and the high voltage side is connected to a relatively high DC voltage. The first DC system(s) of the first to third embodiments may be low voltage system(s) and the second DC system(s) may be high voltage system(s), ie $V_1$ (or $V_{1i}$) may be a relatively low and $V_2$ (or $V_{2j}$) may be relatively high. However, it will be appreciated that the DC voltages on each side of the converter may be equal.

It will be appreciated that in all aspects of the invention, the converter may be operated at less than maximum power by varying the (difference between) the AC voltage angles $\alpha_1, \alpha_2$ (or $\alpha_{1i}, \alpha_{2j}$) or varying the voltage magnitudes $V_{1ac}$, or $V_{2acm}$. Thus, whilst the converter may be operated for maximum power transfer by setting the difference between the AC voltage angles to be, for each k1, $$arctg\sqrt{\frac{V_2^2}{V_1^2 k_1^2} - 1},$$

and for case substantially 270 or 90 degrees, operation at lower $k_1=0$ it is powers may be achieved by varying the difference between these angles. In general, a difference in the range 180-360 degrees will give power transfer in one direction, and a difference in the range 0-180 degrees will give power transfer in the opposite direction.

It will be appreciated that a p phase AC system has p connecting nodes (wires).

In general, features described herein in relation to one aspect or embodiment of the invention may also be applied to any other aspect or embodiment of the invention described herein, either alone or in combination with other features.

According to an aspect of the invention there is provided a converter for transferring power up to maximum level $P_{12}$ between a DC system of low voltage $V_1$ and a DC system of high voltage $V_2$, comprising of:

an AC/DC converter transforming DC voltage $V_1$ into a single phase AC voltage $V_{ac1}$, of frequency $\omega$, root mean square magnitude $V_{ac1m}$ and angle $\alpha_1$, an AC/DC converter transforming DC voltage $V_2$ into a single phase AC voltage $V_{aC2}$, of same frequency $\omega$, root mean square magnitude $V_{aC2m}$ and angle $\alpha_2$, two inductors and a capacitor connected in a star $L_1CL_2$ circuit at their first terminals; the second terminal of capacitor C and second terminal of first inductor $L_1$ connecting to the first AC voltage $V_{ac1}$, the second terminal of the capacitor C and the second terminal of the second inductor $L_2$ connecting to the second AC voltage $V_{ac2}$, where the components $L_1$, C and $L_2$ are selected for maximum power transfer at minimal losses as:

$k_1 = 1-\omega^2 L_2 C$ $k_2 = 1-\omega^2 L_1 C$ $k_3 = L_1 + L_2 + \omega^2 L_1 L_2 C$ and where $k_1$ is selected in the region:

$$-\frac{V_2}{V_1} < k_1 < 1$$

and where $$k_2 = k_1 s^2$$

$$k_3 = \frac{-p8V_1V_2\sqrt{1-(V_1/V_2)^2 k_1^2}}{P_{1ac}\omega\pi^2}$$

and operated in such way that for maximum power transfer the difference between AC voltage angles is $$\alpha_2 - \alpha_1 = arctg\sqrt{\frac{V_2^2}{V_1^2 k_1^2} - 1}$$

for one power direction, or $$\alpha_2 - \alpha_1 = 180 - arctg\sqrt{\frac{V_2^2}{V_1^2 k_1^2} - 1}$$

for the opposite power direction.

According to an aspect of the invention there is provided a converter for transferring power up to maximum level $P_{12}$ between a DC system of low voltage $V_1$ and a DC system of high voltage $V_2$, comprising of:

an AC/DC converter transforming DC voltage $V_1$ into a p phase AC voltage $V_{ac1}$, of frequency $\omega$, root mean square magnitude $V_{ac1m}$ and angle $\alpha_1$, an AC/DC converter transforming DC voltage $V_2$ into a p phase AC voltage $V_{ac2}$, of same frequency $\omega$, root means square magnitude $V_{ac2m}$ and angle $\alpha_2$, two inductors and a capacitor per each phase connected in a star $L_1CL_2$ circuit at their first terminals; the second terminal of first inductor $L_1$ connecting to one phase of first AC voltage $V_{ac1}$, the second terminal of the second inductor $L_2$ connecting to corresponding phase of the second AC voltage $V_{ac2}$, and the second terminals of all capacitors C connected to a common point where the components $L_1$, C and $L_2$ are selected for maximum power transfer at minimal losses as:

$k_1=1-\omega^2 L_2 C$ $k_2=1-\omega^2 L_1 C$ $k_3=L_1+L_2-\omega^2 L_1 L_2 C$ and where $k_1$ is selected in the region:

$$-\frac{V_2}{V_1} < k_1 < 1$$

and where $$k_2 = k_1 s^2$$

$$k_3 = \frac{-p8V_1V_2\sqrt{1-(V_1/V_2)^2 k_1^2}}{P_{1ac}\omega\pi^2}$$

and operated in such way that for maximum power transfer the difference between AC voltage angles is $$\alpha_2 - \alpha_1 = arctg\sqrt{\frac{V_2^2}{V_1^2 k_1^2} - 1}$$

for one power direction, or $$\alpha_2 - \alpha_1 = 180 - arctg\sqrt{\frac{V_2^2}{V_1^2 k_1^2} - 1}$$

for the opposite power direction.

According to an aspect of the invention there is provided a converter having n DC terminals on low voltage side and m DC terminals on high voltage side, transferring up to maximum power $P_{nm}$ between low voltage and high voltage side, and comprising of:

n, AC/DC converters transforming DC voltages $V_{1i}$ (i=1, 2, ... n), into p phase AC voltages $V_{ac1i}$, of frequency $\omega$, root mean square magnitude $V_{ac1m}$ and angle $\alpha_1$, m, AC/DC converter transforming DC voltages $V_{2j}$ (j=1, 2, ... m), into a p phase AC voltage $V_{ac2j}$, of same frequency $\omega$, magnitude $V_{ac2jm}$ and angle $\alpha_2$, n $L_1$ inductors, m $L_2$ inductors and a capacitor C per each phase connected in a star $L_1CL_2$ connection at their first terminals, the second terminals of inductors $L_{1i}$ connecting to one phase of AC voltages $V_{ac1i}$, the second terminals of inductors $L_{2j}$ connecting to respective phases of AC voltages $V_{ac2j}$, and the second terminals of all capacitors C connected in a common point where the components $L_1$, C and $L_2$ are selected for maximum power transfer and minimal currents. One feasible solution is:

the capacitor:

$$C = nmP_{nm} \bigg/ \left(p\omega \sum_{i=1}^{n} V_{1iac} \sum_{j=1}^{m} V_{2iac}\right)$$

the inductors $L_1=n/(\omega^2 C)$, $L_2=m/(\omega^2 C)$ operated in such way that for maximum power transfer the AC voltage angles at low voltage side are $\alpha_{1i}=0$ and the AC voltage angles at high voltage side are $\alpha_{2j}=270$ for one power direction, but the AC voltage angles at high voltage side are $\alpha_{2j}=90$ for the opposite power direction.

According to an aspect of the present invention there is provided a converter for transferring power up to maximum level $P_{12}$ between a p phase AC system of voltage $V_{ac1}$ with frequency $\omega$, root mean square magnitude $V_{ac1m}$, angle $\alpha_1$, and a DC system of voltage $V_2$, comprising of:

an AC/DC converter transforming DC voltage $V_2$ into a p phase AC voltage $V_{ac2}$, of frequency $\omega$, root means square magnitude $V_{aC2m}$ and angle $\alpha_2$, two inductors and a capacitor per each phase connected in a star $L_1CL_2$ circuit at their first terminals; the second terminal of first inductor $L_1$ connecting to one phase of AC voltage $V_{ac1}$, the second terminal of the second inductor $L_2$ connecting to corresponding phase of the voltage $V_{ac2}$, and the second terminals of all capacitors C connected to a common point where the components $L_1$, C and $L_2$ are selected for maximum power transfer at minimal losses as:

$k_1=1-\omega^2 L_2 C$ $k_2=1-\omega^2 L_1 C$ $k_3=L_1+L_2-\omega^2 L_1 L_2 C$ and where $k_1$ is selected in the region:

$$-\frac{V_2}{V_1} < k_1 < 1$$

and where $$k_2 = k_1 s^2$$

$$k_3 = \frac{-p8V_1V_2\sqrt{1-(V_1/V_2)^2 k_1^2}}{P_{1ac}\omega\pi^2}$$

and operated in such way that for maximum power transfer the difference between AC voltage angles is $$\alpha_2 - \alpha_1 = arctg\sqrt{\frac{V_2^2}{V_1^2 k_1^2} - 1}$$

for one power direction, or $$\alpha_2 - \alpha_1 = 180 - arctg\sqrt{\frac{V_2^2}{V_1^2 k_1^2} - 1}$$

for the opposite power direction.

Preferably, power flow is controlled using one of the following methods:
a) varying AC voltage magnitude by changing width of the AC pulses,
b) varying the angle difference between the AC sources,
c) varying the operating frequency.

Embodiments of the present invention will now be described with reference to the accompanying drawings in which: —

FIGS. 5a-5e illustrate the response of the PSCAD/EMTDC simulation to a change in control angle $\gamma_1$, for a 2 terminal 2 phase converter;

FIGS. 6a-6d illustrate a PSCAD/EMTDC simulation of a reversal in power transfer direction, for a 2 terminal 2 phase converter;

FIGS. 1a to 1b illustrate three DC/DC converters which embody the invention. The converters of FIGS. 1a to 1b are configured to transfer power between a first bipolar, centrally grounded DC system of low voltage $\pm V_1$ and a second bipolar, centrally grounded DC system of high voltage $\pm V_2$.

It will be appreciated that power may be transferred from the low voltage system to the high voltage system or from the high voltage system to the low voltage system. Thus, each voltage system may be either a source or sink, depending on the direction of power transfer.

Figure 1A:
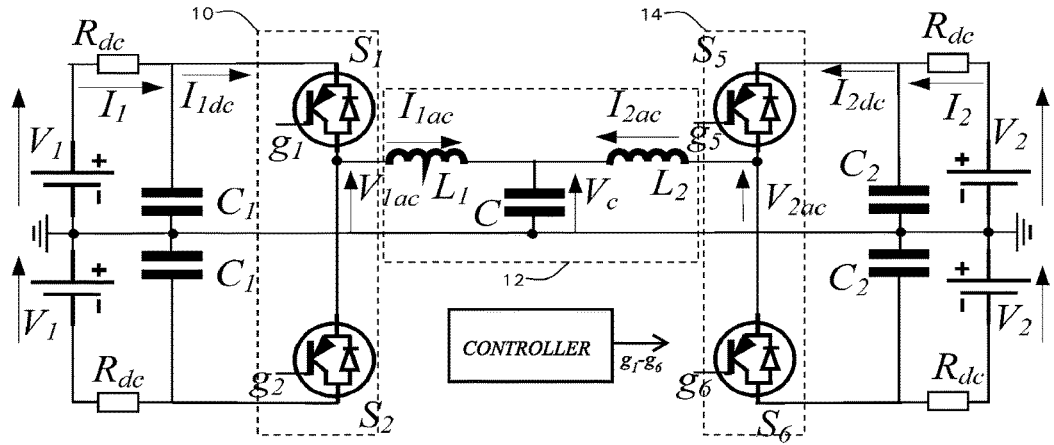
FIG. 1a shows a 2 terminal, single phase DC/DC converter with half-bridge which embodies the invention.

FIG. 1a shows the single phase topology of the converter. The converter comprises a low voltage DC/AC converter 10, an inner resonant circuit 12 and a high voltage DC/AC converter 14.

The two DC/AC converters 10, 14 each comprise two switches, (respectively $S_1,S_2$ and $S_5,S_6$) arranged as a half bridge. The low voltage DC/AC converter is connected to convert the low DC voltage $V_1$ into a first single phase AC voltage $V_{1ac}$. Similarly, the high voltage DC/AC converter is connected to convert the high DC voltage $V_2$ into a second single phase AC voltage $V_{2ac}$.

The inner resonant circuit 12 comprises two inductors $L_1,L_2$ and a capacitor C connected as a star $L_1CL_2$ circuit at their first terminals. The second terminal of inductor $L_1$ and the second terminal of the capacitor C are connected to the first AC voltage $V_{1ac}$. The second terminal of inductor $L_2$ and the second terminal of the capacitor C are connected to the second AC voltage $V_{2ac}$.

In FIG. 1a, each pole of the low voltage system is shown to be connected to a first terminal of a resistor $R_{dc}$, the second terminal of which is connected to a first terminal of a respective capacitor $C_1$. The second terminal of each capacitor $C_1$ is connected to ground. A similar arrangement exists on the high voltage side of the converter where the capacitor is labelled $C_2$. The capacitors $C_1,C_2$ filter the harmonics and improve power quality. The resistors $R_{dc}$ are included to represent a general DC load. The current $I_{dc1}$ ($I_{dc2}$) consists of half cycles of single polarity, whereas current $I_1$ ($I_2$) is true DC current as would be required in many applications. A half-bridge (single phase) topology suffers very high harmonic content. Thus, multi phase topologies may be more desirable for higher-power applications.

Figure 1B:
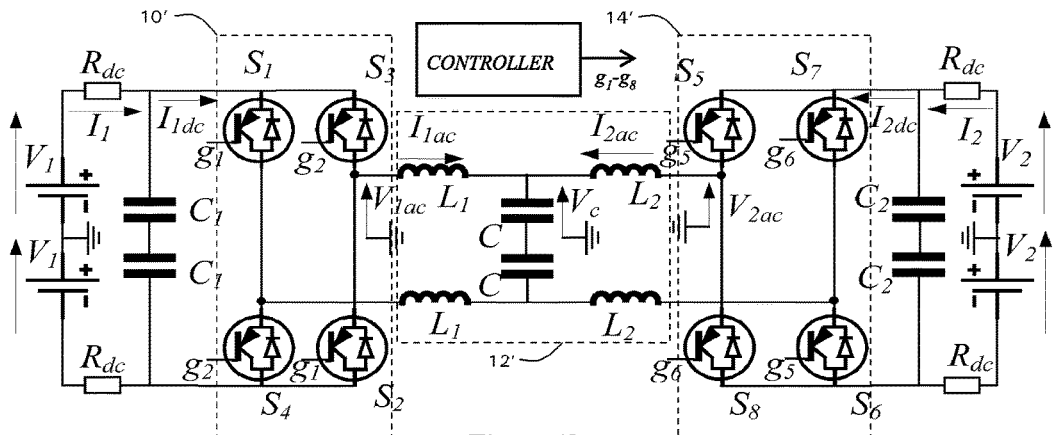
FIG. 1b shows a 2 terminal, 2 phase, DC/DC converter which embodies the invention.

FIG. 1b shows the 2 phase topology of the converter. The circuit of FIG. 1b is similar to that of FIG. 1a. However, the two DC/AC converters 10', 12' each comprise four switches (respectively $S_1$-$S_4$ and $S_5$-$S_8$) arranged as a full bridge (two legs).

The low voltage DC/AC converter is connected to convert the low DC voltage $V_1$ into a first 2 phase AC voltage $V_{1ac}$. Similarly, the high voltage DC/AC converter is connected to convert the high DC voltage $V_2$ into a second 2 phase AC voltage $V_{2ac}$.

The inner resonant circuit 12' comprises two inductors $L_1$, $L_2$ and a capacitor C, for each phase of the converter. The components associated with each phase are connected as a star $L_1CL_2$ circuit at their first terminals, and the second terminals of the inductors $L_1,L_2$ are respectively connected to the corresponding phases of the AC voltages $V_{1ac}$ and $V_{2ac}$. The second terminals of the capacitors for both phases are connected to a common point.

Figure 1C:
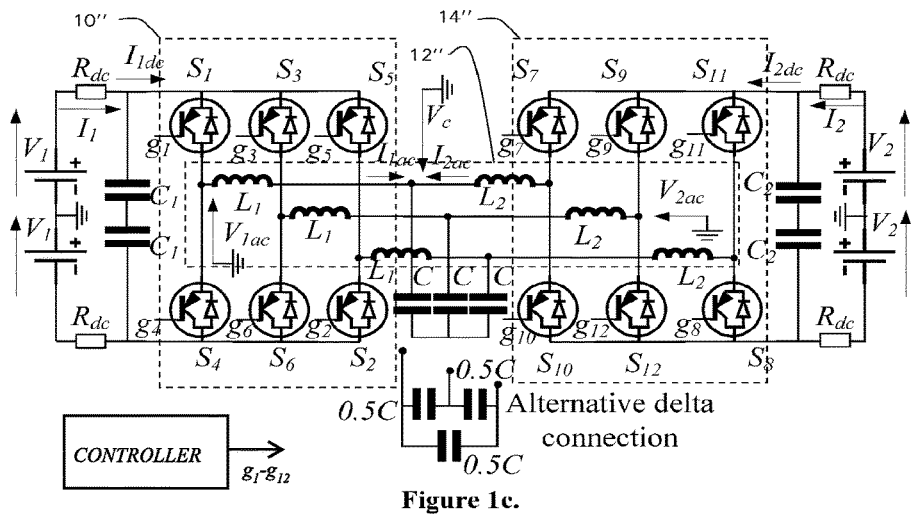
FIG. 1c shows a 2 terminal, 3 phase, DC/DC converter which embodies the invention.

FIG. 1c shows the 3 phase topology of the converter. The circuit is similar to that of FIG. 1b. However, the DC/AC bridges 10",14" comprise 6 switches (respectively $S_1$-$S_6$ and $S_7$-$S_{12}$) arranged in three legs, to produce a 3 phase AC voltage. Correspondingly, the inner resonant circuit 12" comprises three sets of inductors $L_1$, $L_2$ and capacitor C, one set associated with each phase. A converter with a greater number of phases may be implemented by applying the same principles. In the circuit of FIG. 1c, the capacitors C are connected to a common point (star point). However, alternative delta connection of the capacitors is also shown.

In what follows, reference is made to the 2 phase converter illustrated in FIG. 1b. However, it will be appreciated that the same or a similar analysis applies to topologies with different numbers of phases.

A design goal is controllable power transfer between a low voltage DC system $V_1$ and a high voltage system $V_2$. It is assumed that $V_1$ and $V_2$ do not change polarity, but that they can deliver or sink power. Thus, bi-directional power flow is achieved by means of current direction change.

Figure 2:
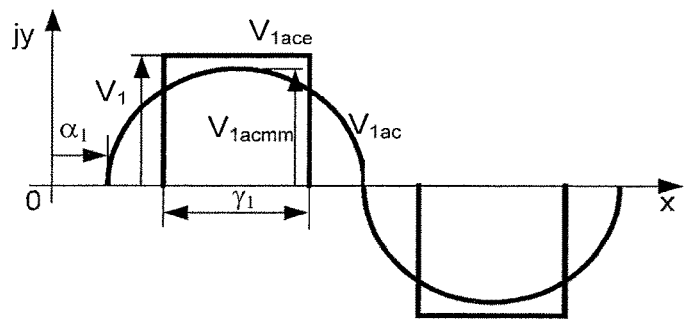
FIG. 2 shows the AC voltage generated by the low voltage DC/AC bridge in the 2 phase converter of FIG. 1b.

Each of the DC/AC bridges 10',14' may be operated in a square-wave fashion or using other methods for generating AC from DC. FIG. 2 shows the AC voltage output $V_{1ac}$ of the low voltage DC/AC bridge. $V_1$ is the magnitude of the low voltage DC source, $\alpha_1$ is the phase angle of $V_{1ac}$, $\gamma_1$ is the conduction angle of $V_{1ac}$, $V_{1acf}$ is the fundamental component of $V_{1ac}$ and $V_{1acmm}$ is the peak magnitude of $V_{1ac}$.

Square-wave operation of the DC/AC bridges is achieved by sequentially firing gates $g_1$ and $g_2$ on the low voltage side, and gates $g_5$ and $g_6$ on the high voltage side. The converter AC voltages $V_{1ac}$ and $V_{2ac}$ can be expressed as:

$$V_{1ac}=V_{1acm}\angle\alpha_1=V_{1acx}+jV_{1acy} \quad (1)$$

$$V_{2ac}=V_{2acm}\angle\alpha_2=V_{2acx}+jV_{2acy} \quad (2)$$

where $V_{1acm}$ is the magnitude of $V_{1ac}$, $V_{2acm}$ is the magnitude of $V_{2ac}$, $\alpha_1$ is the phase angle of $V_{1ac}$ and $\alpha_2$ is the phase angle of $V_{2ac}$.

The firing angles $\alpha_1, \alpha_2$ and the conduction angles $\gamma_1, \gamma_2$ can be externally manipulated from the converter controller (not shown). Using Fourier series expansion, the root mean square (RMS) of the fundamental component of the AC voltage magnitude is (line neutral):

$$V_{1acm}=4V_1/(\sqrt{2}\pi)\cdot\sin(\gamma_1/2), V_{2acm}=4V_2/(\sqrt{2}\pi)\cdot\sin(\gamma_2/2) \quad (3)$$

In equation (3), the conduction angles $\gamma_1, \gamma_2$ can be used to control the magnitude of the AC voltage, considering that the DC voltages $V_1$ and $V_2$ are constant. The maximum power is obtained for full conduction, ie $\gamma_1=\gamma_2=180$ degrees.

Further the xy components of control signal $M_{1acx}$ and $M_{1acy}$ can be represented as $$V_{1acx} = \frac{4V_1}{\pi\sqrt{2}}\sin\frac{\gamma_1}{2}\cos\alpha_1 = \frac{4V_1}{\pi\sqrt{2}}M_{1m}\cos\alpha_1 = \frac{4V_1}{\pi\sqrt{2}}M_{1x}$$

$$V_{1acy} = \frac{4V_1}{\pi\sqrt{2}}\sin\frac{\gamma_1}{2}\sin\alpha_1 = \frac{4V_1}{\pi\sqrt{2}}M_{1m}\sin\alpha_1 = \frac{4V_1}{\pi\sqrt{2}}M_{1y}$$

$$M_{1m} = \sqrt{M_{1x}^2 + M_{1y}^2} = \sin\frac{\gamma_1}{2}$$

The basic equations for the inner resonant circuit are:

$$I_{1ac}=I_{1acm}\angle\beta_1=(V_{1ac}-V_c)/(j\omega L_1), \quad (4)$$

$$I_{2ac}=I_{2acm}\angle\beta_2=(V_{2ac}-V_c)/(j\omega L_2) \quad (5)$$

$$j\omega C V_c=I_{1ac}+I_{2ac} \quad (5)$$

where $\omega=2\pi f_s$ and $f_s$ is the converter switching frequency. The coordinate frame can be positioned arbitrarily. Thus, without loss of generality, $V_{1ac}$ can be positioned on the x-axis ($\alpha_1=0$). Thus:

$$V_{1ac}=V_{1acx}=V_{1acm}, V_{1acy}=0 \quad (6)$$

We will conveniently rewrite equations (4)-(5) as:

$$\overline{I_{1ac}} = \frac{V_{1acm}k_1 - \overline{V_{2ac}}}{j\omega \cdot k_3} \quad (17)$$

$$\overline{I_{2ac}} = \frac{\overline{V_{2ac}}k_2 - V_{1acm}}{j\omega \cdot k_3} \quad (18)$$

where the coefficients $k_1$, $k_2$ and $k_3$ are:

$$k_1=1-\omega^2 L_2 C \quad (19)$$

$$k_2=1-\omega^2 L_1 C \quad (20)$$

$$k_3=L_1+L_2-\omega^2 L_1 L_2 C \quad (21)$$

The above variables $k_1$, $k_2$ and $k_3$ are conveniently introduced to study converter behavior. Ultimately, we need to determine the three parameters: $L_1$, $L_2$ and C, which can be obtained from the three equations (19)-(21). The coefficient $k_3$ is a positive non-zero constant that is fully determined by the power transfer level. Coefficients $k_1$ and $k_2$ are manipulated in the design stage, as it is discussed in section C below. Since $\omega>0$, $L_1>0$, $L_2>0$, $C>0$, from (19)-(21) we have upper limits:

$$k_1<1, k_2<1, k_3<L_1+L_2 \quad (22)$$

A. Converter Controllability for Minimal Reactive Power Circulation

It is essential to minimize reactive power flow in LCL circuit in order to operate with minimum current magnitudes and to reduce switching losses.

The converter has 3 control signals that can be manipulated $M_{1d}$, $M_{2d}$ and $M_{2q}$ to minimise reactive power. Using (17) the low voltage side AC current $\overline{I_{1ac}}$ is:

$$\overline{I_{1ac}} = \frac{V_{1acm}k_1 - V_{2acd} - jV_{2acq}}{j\omega \cdot k_3} = \frac{-V_{2acq}}{\omega \cdot k_3} - j\frac{V_{1acm}k_1 - V_{2acd}}{\omega \cdot k_3} \quad (23)$$

The condition for zero reactive power at terminal 1, $I_{1acq}=0$, is obtained from (23):

$$0=V_1 M_{1d} k_1 - V_2 M_{2d} \quad (24)$$

Therefore the control law for $I_{1acq}=0$ is from (24):

$$M_{1d} = \frac{V_2 M_{2d}}{V_1 k_1} \quad (25)$$

Using (25) and (23) we derive power expression:

$$P_{1ac} = \text{Re}(\overline{V_{1ac}} \cdot \overline{I_{1ac}}^*) = -pV_{1acm}\frac{V_{2acq}}{\omega k_3} = -pV_{1acm}\frac{2\sqrt{2} V_2 M_{2q}}{\pi\omega k_3} \quad (26)$$

where p is the number of phases (p=2 for the converter in FIG. 1). Therefore $M_{2q}$ is used for controlling power.

On the high voltage side, AC current is from (18):

$$\overline{I_{2ac}} = \frac{V_{2acd}k_2 - jV_{2acq}k_2 - V_{1acm}}{j\omega \cdot k_3} = \frac{-V_{2acq}k_2}{\omega \cdot k_3} + j\frac{V_{1acm} - V_{2acd}k_2}{\omega \cdot k_3} \quad (27)$$

Using (27), zero reactive power condition at terminal 2 is:

$$\frac{V_{2acq}}{V_{2acd}} = \frac{I_{2acq}}{I_{2acd}} = \frac{V_{1acm} - V_{2acd}k_2}{V_{2acq}k_2} \quad (28)$$

After rearranging (28) and using (25):

$$M_{2q}^2 V_2^2 k_2 = \frac{M_{2d}^2 V_2^2}{k_1} - M_{2d}^2 V_2^2 k_2 \quad (29)$$

Therefore replacing (24) in (29), to provide zero reactive power on high voltage side we operate the converter as:

$$M_{2d} = \frac{M_{2q}}{\sqrt{\frac{1}{k_2 k_1} - 1}} \quad (30)$$

The above equation implies that the phase angle of AC voltage $V_{2ac}$ is constant and for a given $k_1$ and $k_2$:

$$\alpha_2 = arctg \frac{M_{2q}}{M_{2d}} = arctg \sqrt{\frac{1}{k_2 k_1} - 1} \quad (31)$$

B. Calculation of $k_1$, $k_2$ and $k_3$

The influence of $k_1$, $k_2$ and $k_3$ will be discussed in this section, considering full power transfer. We assume that maximum control signals are provided at maximum power transfer (in order to get minimal currents).

$$M_{1mmax} = M_{2mmax} = 1 \quad (32)$$

Replacing (32) in (25):

$$M_{2dmax} = \frac{V_1 k_1}{V_2} \quad (33)$$

Since $|M_{2d}| \leq 1$, $|M_{1d}| \leq 1$, we get the boundaries for $k_1$:

$$-\frac{1}{s} < k_1 < 1 \quad (34)$$

where s is the stepping ratio $V_1/V_2$. Using (33), we can also calculate the maximum q component control signal $M_{2qmax}$:

$$M_{2qmax} = \sqrt{1 - M_{2dmax}^2} = \sqrt{1 - s^2 k_1^2} \quad (35)$$

Replacing (33) in (29) at maximum power (32):

$$M_{2q}^2 V_2^2 k_2 = V_1^2 k_1 - M_{2d}^2 V_2^2 k_2 \quad (36)$$

Re-writing (36), we obtain formula for calculating $k_2$:

$$k_2 = k_1 s^2 \quad (37)$$

The coefficient $k_3$ is calculated from active power condition (26), and replacing (33):

$$k_3 = \frac{-pV_{1acm} M_{2qmax} 2\sqrt{2} V_2}{P_{1ac} \omega \pi} = \frac{-pV_1 8 V_2 \sqrt{1 - s^2 k_1^2}}{P_{1ac} \omega \pi^2} \quad (38)$$

The converter design procedure is as follows: —
1) Given data are $V_1$, $V_2$ and $P_1$ (assuming lossless converter $P_1 = P_{1ac}$)
2) Using equation (3), calculate $V_{1acm}$ and $V_{2acm}$.
3) Considering the physical nature of the switches, select a suitable switching frequency $f_s$, where $\omega = 2\pi f_s$).
4) Select the number of phases p.
5) Select value of k1 according to the performance requirements for particular converter. Larger negative k1 will give lower switching loses but larger fault currents. The lowest fault currents are achieved for $k_1 = 0$. Note that all $k_1$ from the above range will give minimal currents.
6) Determine k2 and k3 from equations (xx) (yy).
7) Determine C, L1 and L2 from equations (zz)
A good initial guess for k1 is middle of the range.

A test system module has been developed using a PSCAD/EMTDC simulator. The test system data for a 3 MW, 2 kV/40 kV converter are given in tables 1a and 1b.

TABLE 1a

| Given Parameters | Value |
| --- | --- |
| Power $P_1$ | 3 MW |
| Pole voltage $V_1$ | 2 kV |
| Pole voltage $V_2$ | 40 kV |
| Switching frequency f | 1 kHz |
| DC line resistance $R_{dc}$ | 0.05 Ω |
| Filter capacitance $C_1$ | 300 μF |
| Filter capacitance $C_2$ | 20 μF |
| Number of phases p | 2 |

TABLE 1b

| Calculated Parameters | Value |
| --- | --- |
| Line-neutral AC voltage $V_{1ac}$ | 1.8 kV |
| Line-neutral AC voltage $V_{2ac}$ | 36 kV |
| Capacitance C | 3.68 μF |
| Inductance $L_1$ | 6.88 mH |
| Inductance $L_2$ | 6.88 mH |

Figure 4A:
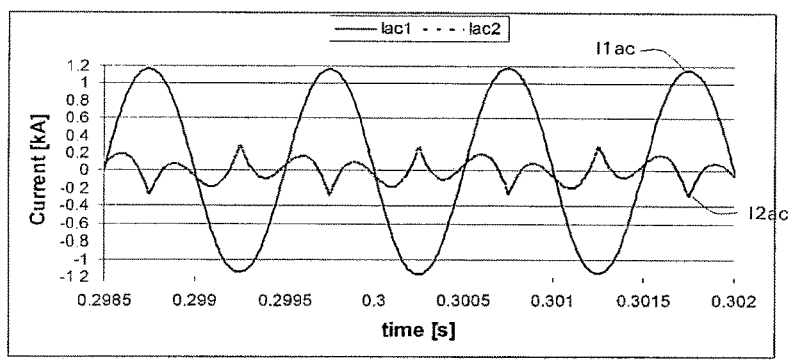
FIGS. 4a-4d illustrate the results of a PSCAD/EMTDC simulation of normal operation of a 2 terminal 2 phase converter.
Figure 4B:
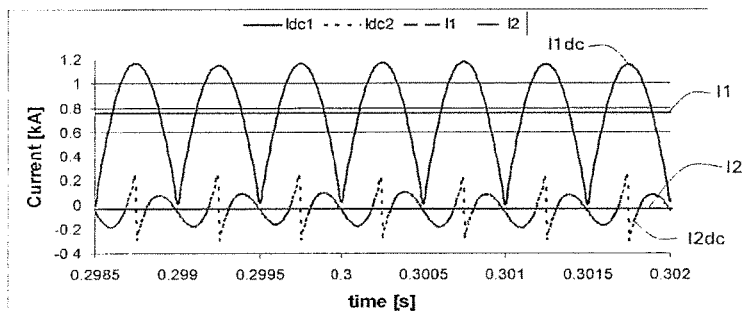
Figure 4C:
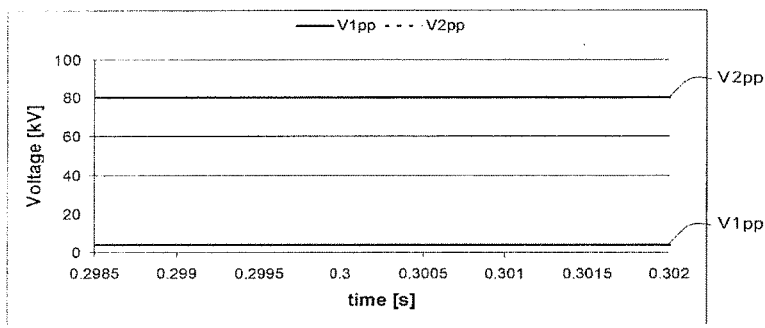
Figure 4D:
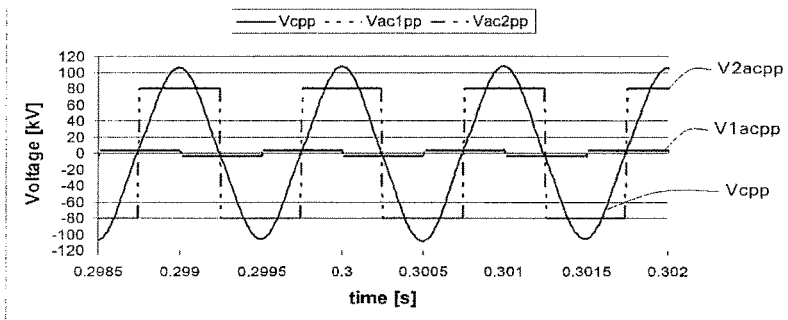
Figure 5A:
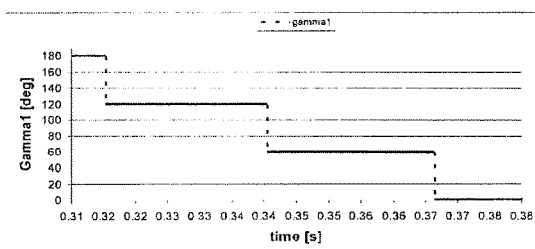
Figure 5B:
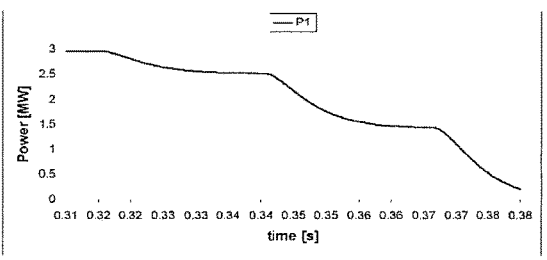
Figure 6B:
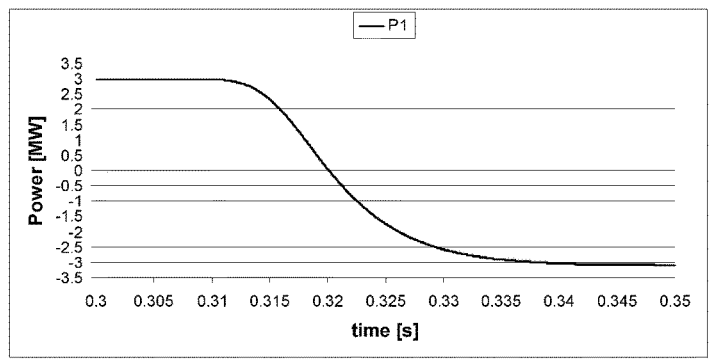
Figure 6C:
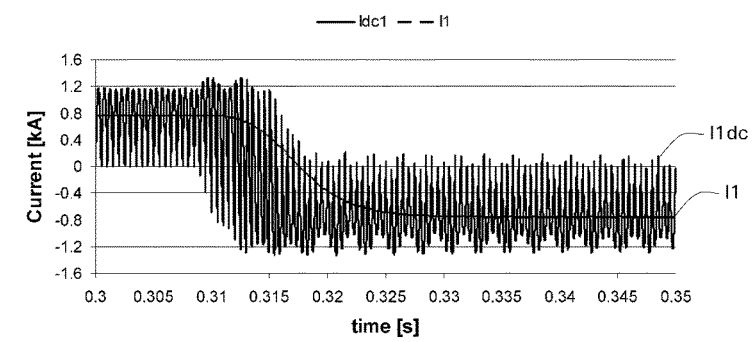
Figure 6D:
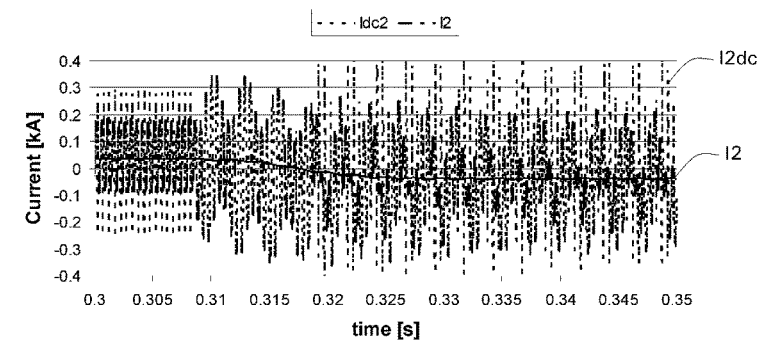
Figure 7A:
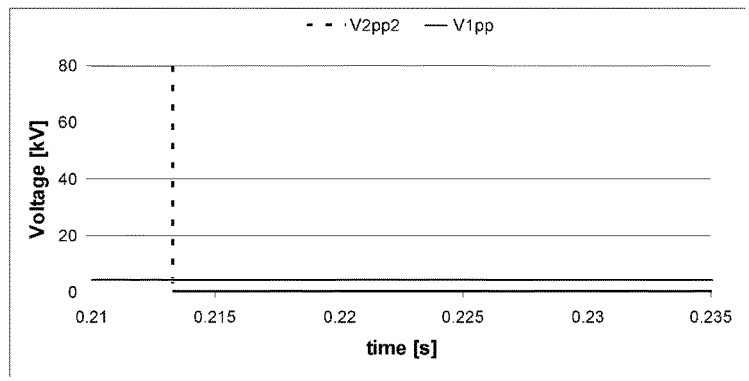
FIGS. 7a-7d illustrate the response of the PSCAD PSCAD/EMTDC simulation after a zero impedance fault on $V_2$.
Figure 7B:
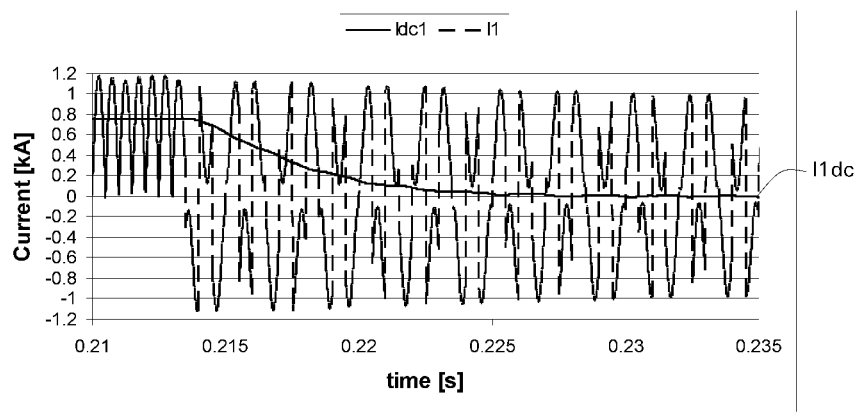
Figure 7C:
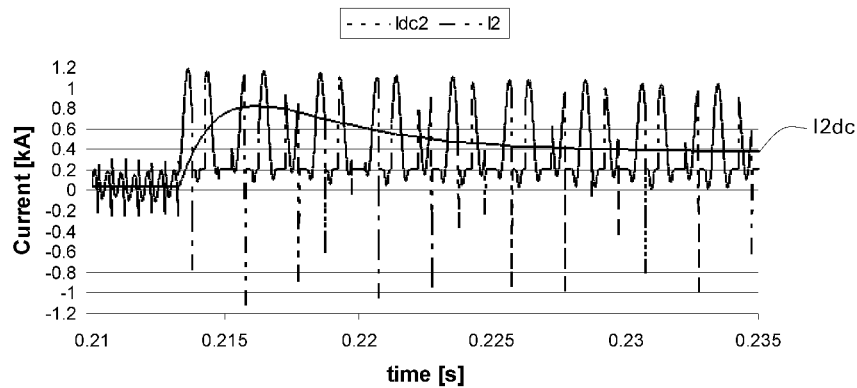
Figure 7D:
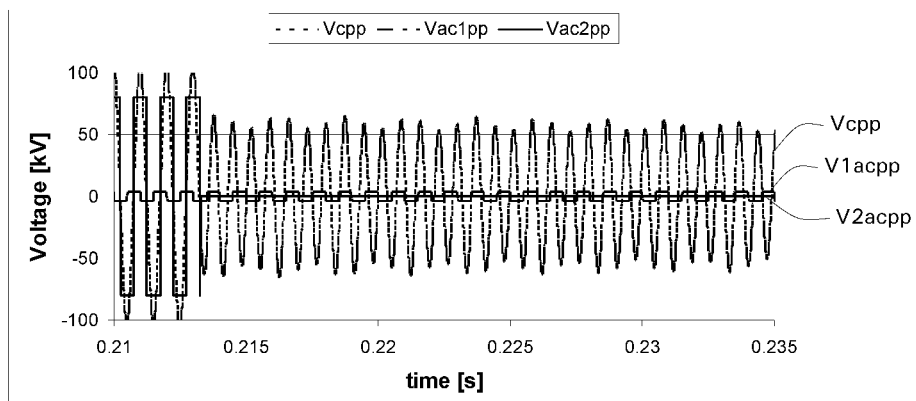

FIGS. 4a to 4d show the converter PSCAD model simulation in steady-state in step-up mode. It can be seen that the internal AC circuit correctly achieves the voltage and current stepping, ie, low $V_{1ac}$ and $I_{2ac}$, high $V_{2ac}$ and $I_{1ac}$. It can also be seen that voltages and currents at the respective terminals are in phase, which implies low conduction losses due to the minimal current magnitude, and low switching losses due to zero current switching. FIG. 4a shows that $I_{2ac}$ has some harmonic content. The voltages in FIGS. 4c and 4b are measured as pole-pole (phase phase) and therefore the values are twice those given in tables 1a and 1b.

Controllability of the converters is illustrated in FIGS. 1a to 1c and will now be discussed.

Replacing (2) and (3) in equation (24) gives the power equation:

$$P_{1ac} = p\omega C 4 V_1/(\sqrt{2}\pi) \cdot \sin(\gamma_1/2) \cdot 4 V_2/(\sqrt{2}\pi) \cdot \sin(\gamma_2/2) \cdot \sin(\alpha_2) \quad (28)$$

Considering (28) and (9), the power can be controlled in four ways:
1) using the conduction angle $\gamma_1$;
2) using the conduction angle $\gamma_2$;
3) using the phase angle $\alpha_2$ (ie the difference between $\alpha_2$ and $\alpha_1$); and/or
4) using the switching frequency $\omega$.

The use of $\gamma_1$ for converter control has been tested using the non-linear PSCAD simulator. The test results are illustrated in FIGS. 5a-5e. In the test, $\gamma_1$ was reduced in three steps, from 180, to 100, to 60 degrees. The main converter variables are shown. It is evident that the power reduces as the conduction angle is reduced, as predicted by (28). It can also be seen that the peak value of the internal AC variables does not increase as the conduction angle is varied.

Figure 3:
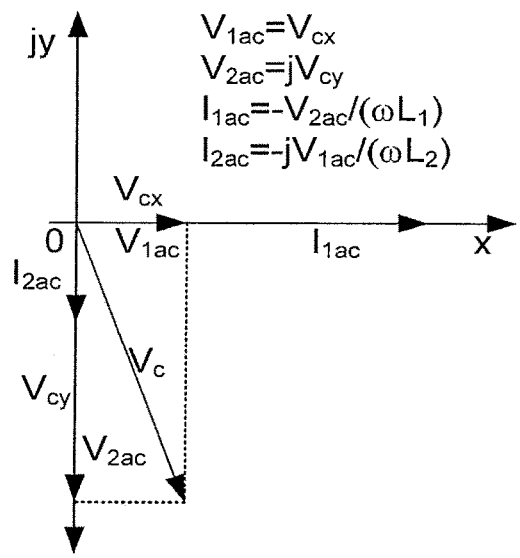
FIG. 3 is a phasor diagram which illustrates operation of a 2 terminal converter.

Since the conduction angle can not be negative, it is not possible to reverse the direction of power transfer by varying the conduction angle. Instead power reversal is achieved by changing $\alpha_2$ from 270 to 90 degrees, noting that $\alpha_2$ should stay on the y-axis to enable zero reactive power flow. This power reversal method can be deduced from the phasor diagram in FIG. 3 and from equation (11). FIGS. 6a-6d show a PSCAD simulation of power reversal using the above method (ie, 3 MW→−3 MW). It can be seen that the converter achieves stable operation at −3 MW power transfer.

Operation of the converters illustrated in FIGS. 1a to 1b under faults is discussed below.

An aim of the present invention is to develop a converter which is fully tolerant to external faults on either of the DC voltages $V_1$, $V_2$.

Assuming a fault on V1, we put V1=0 in the above equations and the fault current I1acf1m relative to rated current I1acm is:

$$\frac{I_{1acf1m}}{I_{1acm}} = \frac{\sqrt{V_{2acrd}^2 + V_{2acrq}^2}}{V_{2acrq}} = \frac{1}{\sqrt{1-k_1^2 s^2}}$$

In the above formula the fault current magnitude is very close to rated value for all reasonable k1.

Similarly for faults on V2, we put V2=0 to obtain:

$$\frac{I_{2acf1m}}{I_{2acm}} = \frac{1}{\sqrt{1+s^2(1/k_2^2 - 2k_1/k_2)}}$$

IN the above formula the fault current is lower than rated current form most k1.

Assuming a special case k1=0, the fault Equations (16) and (17) can be rearranged as follows, $$\omega L_1 = -V_{2acm}/I_{1ac} \quad (29)$$

$$\omega L_2 = -V_{1acm}/I_{2ac} \quad (30)$$

It is evident from equations (29) and (30) that the converter has constant V/I ratio, which implies favourable fault responses. A voltage depression on one side will cause current reduction on the opposite side, given that $\omega L$ is constant. An extreme fault on one side of the converter, eg $V_1=0$, will cause open circuit on the opposite side, eg $I_2=0$. Accordingly, such faults are not transferred through the converter. Thus, the converter can be used as a DC circuit breaker, which prevents DC fault propagation.

In contrast, a common 2-coil AC transformer has the following characteristic: $V_2/V_1=N_2/N_1$, where $N_1$ and $N_2$ are the number of turns of the transformer coils. Such a transformer will directly transfer voltage depressions from one side to another. Accordingly, external protection circuits are required to interrupt fault currents (AC circuit breaker).

FIGS. 7a-7d show the response of the PSCAD simulation to a worst case zero-impedance pole-pole fault on the high voltage terminals, in step-up mode. It can be seen that the current on the input side ($I_1$) automatically reduces without any additional control intervention. The current on the faulted side ($I_2$) transiently increases during the fault, but the switches can be slightly overrated to withstand this temporary overcurrent condition.

Figure 8:
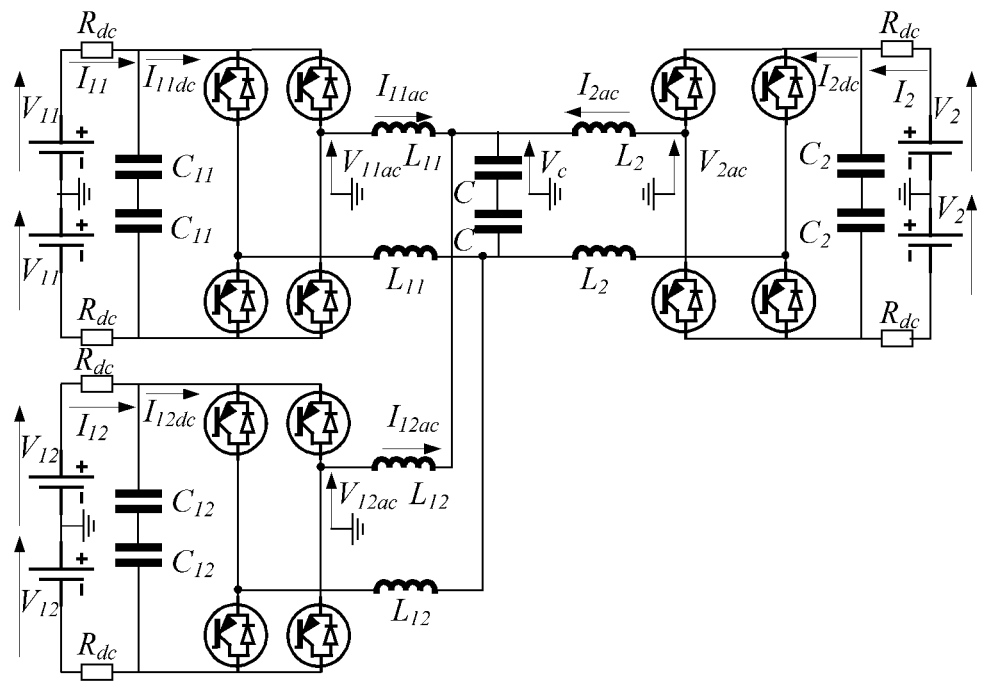
FIG. 8 shows a 3 terminal, 2 phase DC/DC converter which embodies the invention.

FIG. 8 shows a 3 terminal converter which embodies the invention. For simplicity, only the 2 phase topology is discussed herein. However, it will be appreciated that the same or a similar analysis applies to topologies with different numbers of phases. The three terminal configuration may be desirable, for example, for connecting two low voltage sources to a high-power network.

The converter of FIG. 8 is similar to that shown in FIG. 1b, except that the circuit comprises two terminals on the low voltage side, ie, three terminals in total. That is to say, the converter transfers power between two low voltage systems ($V_{11}$ and $V_{12}$) and one high voltage source $V_2$. To simplify study we only consider the case of $k_1=0$.

Both low voltage terminals are connected to a respective DC/AC bridge which respectively converts the DC voltages $V_{11}$, $V_{12}$ into 2 phase AC voltages $V_{11ac}$, $V_{12ac}$. The high voltage terminal is connected to a DC/AC bridge which converts the DC voltages $V_2$ into 2 phase AC voltage $V_{2ac}$.

For each phase of the converter, the inner resonant circuit comprises two inductors $L_{11}$ and $L_{12}$ respectively associated with the two low voltage terminals, a third inductor $L_2$ associated with the high voltage terminal, and a capacitor C. The components $L_{11},L_{12},L_2,C$ associated with each phase are connected together at their first terminals. The second terminals of inductors $L_{11},L_{12},L_2$ associated with each phase are connected to the corresponding phase of the respective AC voltages $V_{11ac},V_{12ac},V_{2ac}$. The capacitors associated with both phases are connected together at a common point.

The basic converter equations are:

$$I_{11ac}=(V_{11ac}-V_c)/(j\omega L_{11}), I_{12ac}=(V_{12ac}-V_c)/(j\omega L_{12}),$$
$$I_{2ac}=(V_{2ac}-V_c)/(j\omega L_2) \quad (31)$$

$$j\omega C V_c = I_{11ac} + I_{12ac} + I_{2ac} \quad (32)$$

Replacing (31) in equation (32) gives:

$$-\omega^2 L_{11} L_{12} L_2 C V_c = (V_{11ac}-V_c) L_{12} L_2 + (V_{12ac}-V_c) L_{11} L_2 + (V_{2ac}-V_c) L_{11} L_{12} \quad (33)$$

Equation (33) can be rearranged as:

$$V_{cx}+jV_{cy}=(V_{11ac}L_{12}L_2+V_{12ac}L_{11}L_2+jV_{2ac}L_{11}L_{12})/(L_{11}L_2+L_{12}L_2+L_{11}L_{12}-\omega^2 L_{11}L_{12}L_2 C) \quad (34)$$

Assuming the low voltages $V_{11},V_{12}$ are aligned with the x-axis and the high voltage $V_2$ is aligned with the y-axis:

$$V_{11ac}=V_{11acx}, V_{12ac}=V_{12acx}, V_{2ac}=jV_{2acy} \quad (35)$$

In order to reduce reactive power circulation on the high voltage side, the y-component of the capacitor voltage should be equal to the voltage on the y-axis:

$$V_{cy}=V_{2ac} \quad (36)$$

Replacing (31) and (36) in equation (34) gives:

$$V_{2ac}(L_{11}L_2+L_{12}L_2+L_{11}L_{12}-\omega^2 L_{11}L_{12}L_2 C)=V_{2ac}L_{11}L_{12} \quad (37)$$

Assuming $L_{11}=L_{12}$, (37) gives:

$$C=2/(\omega^2 L_{11}) \quad (38)$$

Thus, the capacitor size is twice the value calculated for the two-terminal converters of FIGS. 1a-1c (cf equation (19)). The elimination of reactive power circulation on the low voltage side is more complex, because two external voltages are involved. The goal is to get the x-component of the capacitor voltage equal to each of the voltages on the x-axis. As this is not possible to achieve in general, the optimum strategy is to have the x-component of the capacitor voltage equal to the average value of the voltages on the x-axis:

$$V_{cx} = (V_{11ac} + V_{12ac})/2 \tag{39}$$

Figure 9:
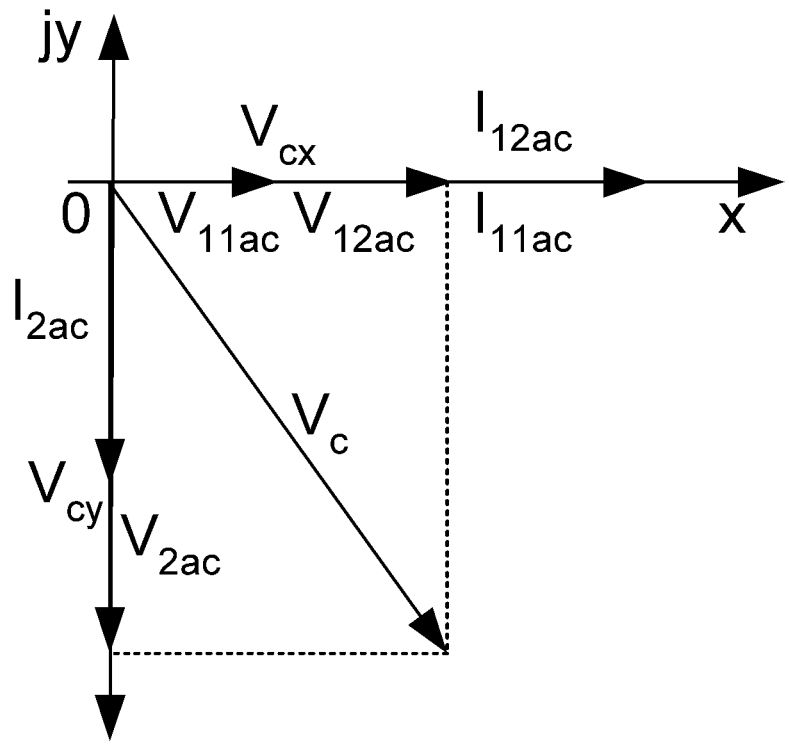
FIG. 9 is a phasor diagram which illustrates operation of a 3 terminal converter.
Figure 10A:
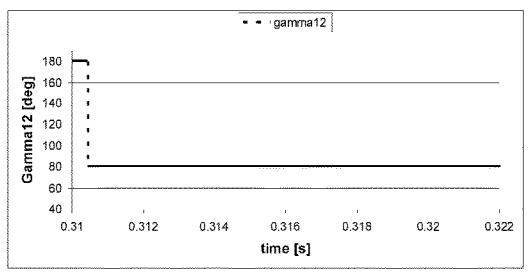
FIGS. 10a-10e illustrate the results of a PSCAD/EMTDC simulation of the 3 terminal 2 phase converter shown in FIG. 9.
Figure 10B:
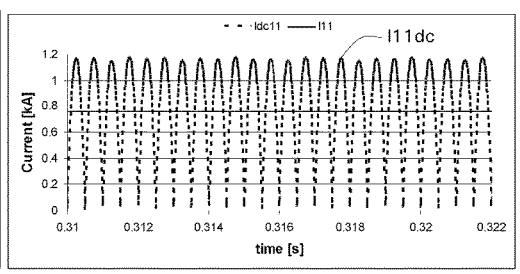
Figure 10C:
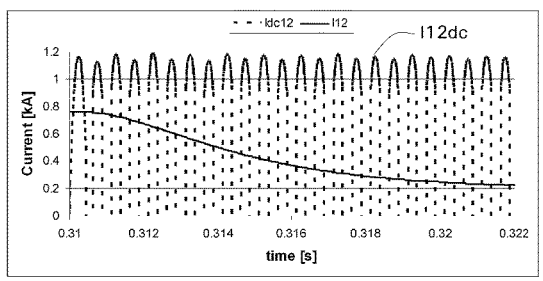
Figure 10D:
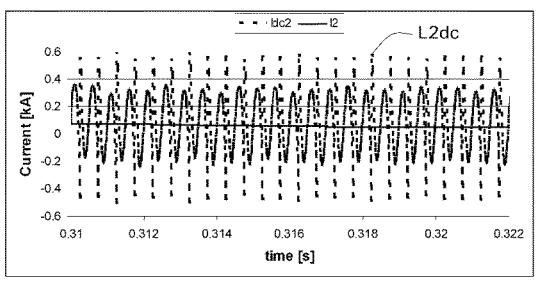
Figure 10E:
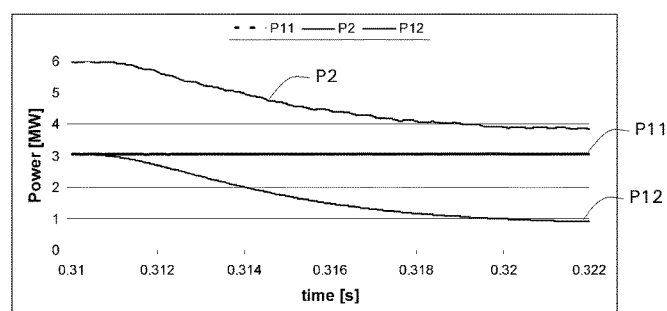

In the case where $V_{11ac} = V_{12ac}$, the x-component of the capacitor voltage will be equal to both $V_{11ac}$ and $V_{12ac}$, and there will be no reactive power circulation. FIG. 9 shows the phasor diagram for this topology. Using equations (34) and (39):

$$(V_{11ac} + V_{12ac})/2 \cdot (L_{11}L_2 + L_{12}L_2 + L_{11}L_{12} - \omega^2 L_{11}L_{12}L_2 C) = V_{11ac}L_{12}L_2 + V_{12ac}L_{11}L_2 \tag{40}$$

Combining equations (40) and (37):

$$L_2 = L_{11}/2 \tag{41}$$

The power for the high voltage terminal is:

$$P_{2ac} = 2V_{2ac}I_{2ac} = 2V_{2ac}(V_{11ac}+V_{12ac})/(2\omega L_2) = 2V_{2ac}\omega C (V_{11ac}+V_{12ac})/2 \tag{42}$$

If the voltages on the low voltage side are equal, equation (42) becomes:

$$P_{2ac} = 2V_{2ac}V_{11ac}\omega C \tag{43}$$

If the voltages on the x-axis are equal, the power is:

$$P_{11ac} = P_{12ac} = 2V_{11ac}I_{11ac} = 2V_{11ac}V_{2ac}/\omega L_{11} = V_{11ac}V_{2ac}\omega C \tag{44}$$

From equations (43) and (44) it can be deduced that the high-voltage converter should be rated for the sum of powers on the low voltage converters.

The converter design procedure is as follows: —
1) Given data are $V_{11}, V_{12}, V_2$ and $P_2$ ($P_2=P_{2ac}$).
2) Using equation (3), calculate $V_{11ac}, V_{12ac}, V_{2ac}$ assuming maximum power transfer ($\gamma$=180).
3) Considering the physical nature of the switches, select a suitable switching frequency $f_s$, where $\omega=2\pi f_s$).
4) Select the number of phases p.
5) Determine a value for capacitance C using (43), which rearranges as:

$$C = P_2/\{p\omega V_{2ac}(V_{11ac}+V_{12ac})\} \tag{45}$$

6) Determine values for inductors $L_{11}, L_{12}, L_2$ from equations (38) and (41), ie:

$$L_2 = 1/(\omega^2 C), L_{11} = L_{12} = 2/(\omega^2 C) \tag{46}$$

The value for $L_2$ may be tuned in the final tests.

A test system has been developed using a PSCAD/EMTDC simulator. The test system data are given in tables 2a and 2b.

TABLE 2a

| Given Parameters | Value |
| --- | --- |
| Power $P_{11ac}$ | 3 MW |
| Power $P_{12ac}$ | 3 MW |
| Pole voltage $V_{11}$ | 2 kV |
| Pole voltage $V_{12}$ | 2 kV |
| Pole voltage $V_2$ | 40 kV |
| Switching frequency $f_s$ | 1 kHz |
| DC line resistance $R_{dc}$ | 0.05 Ω |
| Filter capacitance $C_{11}$ | 300 µF |
| Filter capacitance $C_{12}$ | 300 µF |
| Filter capacitance $C_2$ | 20 µF |
| Number of phases p | 2 |

TABLE 2b

| Calculated Parameters | Value |
| --- | --- |
| Line-neutral AC voltage $V_{11ac}$ | 1.8 kV |
| Line-neutral AC voltage $V_{12ac}$ | 1.8 kV |
| Line-neutral AC voltage $V_{2ac}$ | 36 kV |
| Capacitance C | 7.4 µF |
| Inductance $L_{11}$ | 6.88 mH |
| Inductance $L_{12}$ | 6.88 mH |
| Inductance $L_2$ | 3.44 mH |

FIGS. 10a-10e show the 3-terminal converter PSCAD model simulation in steady state. A negative step on the $V_{12}$ terminal conduction angle $\gamma_{12}$ is applied to illustrate controllability of the converter.

It can be seen that the converter steady-state variables are as predicted by the above equations. All terminals operate at zero reactive power flow. The reduction in $\gamma_{12}$ reduces power on the $V_{12}$ terminal, and also reduces the exit power $P_2$, which is the sum of $P_{11}$ and $P_{12}$. It can also be seen that $P_{11}$ is unchanged, which demonstrates that power on each terminal can be individually controlled.

Figure 11:
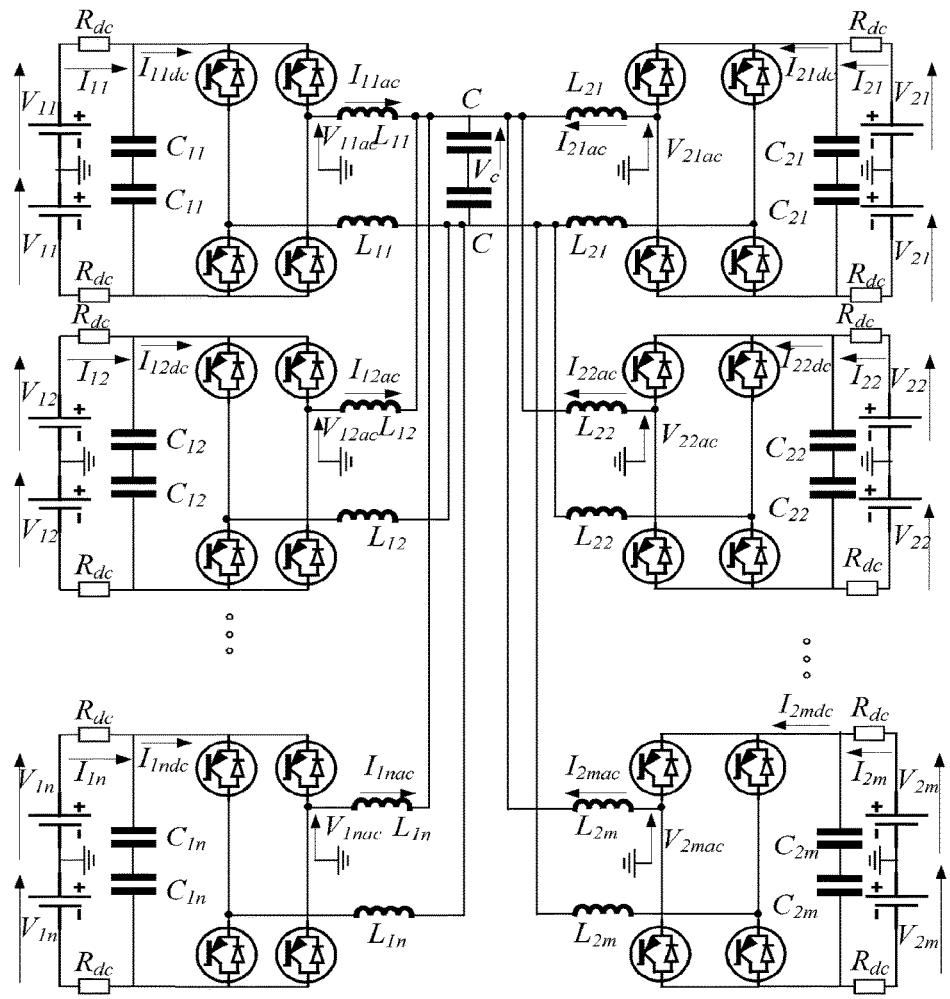
FIG. 11 shows a multi-terminal 2 phase DC/DC converter which embodies the invention.

FIG. 11 shows a multi-terminal converter which embodies the invention. For simplicity, only the 2 phase topology is discussed. However, it will be appreciated that the same or a similar analysis applies to topologies with different numbers of phases.

The converter of FIG. 11 is similar to that shown in FIG. 8, except that the circuit comprises n terminals on the low voltage side and m terminals on the high voltage side, where n and m can each be any positive integer and are not necessarily equal.

The n low voltage terminals are connected to respective DC/AC bridges which respectively convert the DC voltages $V_{1i}$ into 2 phase AC voltages $V_{1iac}$. The m high voltage terminals are connected to respective DC/AC bridges which respectively convert the DC voltages $V_{2i}$ into 2 phase AC voltage $V_{2iac}$.

For each phase of the converter, the inner resonant circuit comprises n inductors $L_{1i}$ respectively associated with the n low voltage terminals, m inductors $L_{2j}$ respectively associated with the m high voltage terminals, and a capacitor C. The components $L_{1i}, L_{2j}, C$ associated with each phase are connected together at their first terminals. The second terminals of inductors $L_{1i}, L_{2j}$ associated with each phase are connected to the corresponding phase of the respective AC voltages $V_{1iac}, V_{2jac}$. The capacitors associated with both phases are connected together at a common point.

In order to minimize reactive power circulation, the capacitor voltages on one axis should be close to the average value. Thus, all low voltages should be aligned with the x-axis, and all high voltages with the y-axis.

The basic circuit equations are:

$$I_{11ac} = (V_{11ac} - V_c)/(j\omega L_{11}), \tag{47}$$
$$I_{12ac} = (V_{12ac} - V_c)/(j\omega L_{12}), \ldots$$
$$I_{1nac} = (V_{1nac} - V_c)/(j\omega L_{1n})$$

$$I_{21ac} = (V_{21ac} - V_c)/(j\omega L_{21}), \tag{48}$$
$$I_{22ac} = (V_{22ac} - V_c)/(j\omega L_{22}), \ldots$$
$$I_{2mac} = (V_{2mac} - V_c)/(j\omega L_{2m})$$

$$j\omega C V_c = \sum_{i=1}^{n} I_{1iac} + \sum_{j=1}^{m} I_{2jac} \tag{49}$$

Assuming that $L_{11}=L_{1i}=L_{1n}=L_1$ and $L_{21}=L_{21}=L_{2n}=L_2$, and replacing (47) and (48) in equation (49) gives:

$$-\omega^2 L_1^n L_2^m C V_c = \sum_{i=1}^{n}(V_{1iac} - V_c)L_1^{n-1}L_2^m + \sum_{j=1}^{m}(V_{2jac} - V_c)L_1^n L_2^{m-1} \quad (50)$$

Given the assumption that all n-voltages are located on the x-axis and all m-voltages on the y-axis, (50) becomes:

$$V_{cx} + jV_{cy} = \left(\sum_{i=1}^{n} V_{1iac}L_1^{n-1}L_2^m + j\sum_{j=1}^{m} V_{2jac}L_1^n L_2^{m-1}\right) / \quad (51)$$
$$(nL_1^{n-1}L_2^m + mL_1^n L_1^{m-1} - \omega^2 L_1^n L_2^m C)$$

The goal is for the y-component of the capacitor voltage to be equal to the average voltage on the y-axis:

$$V_{cy} = (1/m)\sum_{j=1}^{m} V_{2jac} \quad (52)$$

Replacing (52) in equation (50) gives:

$$(1/m)\sum_{j=1}^{m} V_{2jac}(nL_1^{n-1}L_1^m + mL_1^n L_1^{m-1} - \omega^2 L_1^n L_2^m C) = \sum_{i=1}^{m} V_{2iac}L_1^n L_2^{m-1} \quad (53)$$

Solving equation (52) gives the capacitance:

$$C = n/(\omega^2 L_1) \quad (54)$$

Minimising current magnitudes on the low voltage side, the goal is for the x-component of the capacitor voltage to equal the average voltage on the y-axis:

$$V_{cx} = (1/n)\sum_{i=1}^{n} V_{1iac} \quad (55)$$

Replacing (55) in equation (51) gives:

$$(1/n)\sum_{i=1}^{n} V_{1iac}(nL_1^{n-1}L_1^m + mL_1^n L_1^{m-1} - \omega^2 L_1^n L_2^m C) = \sum_{i=1}^{n} V_{1iac}L_1^{n-1}L_2^m \quad (56)$$

Solving (56) gives the capacitance:

$$C = m/(\omega^2 L_2) \quad (57)$$

From equations (57) and (54):

$$L_2 = mL_1/n \quad (58)$$

The power expressions can be derived as:

$$P_{1iac} = 2V_{1iac}I_{1iac} = \quad (59)$$
$$2V_{1iac}(1/m)\sum_{j=1}^{m} V_{2jac}/(\omega L_1) = 2V_{1iac}\sum_{j=1}^{m} V_{2jac}\omega C/(mn)$$

-continued $$P_{2iac} = \quad (60)$$
$$2V_{2jac}I_{2iac} = 2V_{2jac}(1/n)\sum_{i=1}^{n} V_{1iac}/(\omega L_2) = 2V_{2iac}\sum_{i=1}^{n} V_{1iac}\omega C/(nm)$$

If all voltages on corresponding axes are equal, $V_{11}=V_{1i}=V_{1n}$, $V_{2i}=V_{2j}=V_{2n}$, then:

$$P_{1iac}=2V_{1iac}I_{1iac}=2V_{1iac}V_{2jac}/(\omega L_1)=2V_{1iac}V_{2jac}\omega C/n \quad (61)$$

$$P_{2iac}=2V_{2jac}I_{2jac}=2V_{2jac}V_{1iac}/(\omega L_2)=2V_{2jac}V_{1iac}\omega C/m \quad (62)$$

The converter design procedure is as follows:
1) Given data are $V_{1i}$, $V_{2i}$ and the power transfer function between the x and y axes $P_{xy}$, where:

$$P_{xy} = \sum_{i=1}^{n} P_{1i} = \sum_{j=1}^{m} P_{2j}$$

2) Using equation (3), and assuming maximum power ($\gamma=180$) calculate $V_{1iac}$, $V_{2jac}$.
3) Considering the physical nature of the switches, select a suitable switching frequency $f_s$, where $\omega=2\pi f_s$).
4) Select the number of phases p.
5) Determine a value for capacitance C using:

$$C = nmP_{xy} / \left(p\omega \sum_{i=1}^{n} V_{1iac}\sum_{j=1}^{m} V_{2jac}\right) \quad (63)$$

6) Determine values for inductors $L_1$ and $L_2$ using (54) and (57), ie, $$L_1 = n/(\omega^2 C), L_2 = m/(\omega^2 C) \quad (64)$$

Although FIG. 11 shows at least three terminals on each side, in the general case, n and m may each be any positive integer, and are not necessarily equal.

Figure 12:
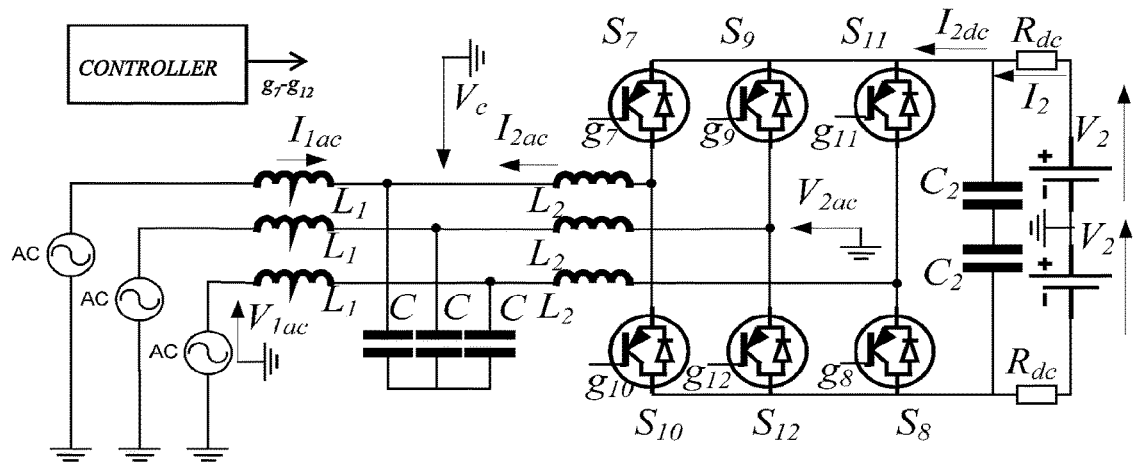
FIG. 12 shows a 2 terminal 3 phase DC/AC converter which embodies the present invention.

The converter concept described above can also be extended to exchange power on the inner AC circuit. One application is to interconnect a DC source/sink with an AC source/sink. This can be achieved if a converter bridge is replaced with an AC source. FIG. 12 shows a 2 terminal, 3 phase converter which embodies the present invention. The converter shown in FIG. 12 is similar to that shown in FIG. 1c, except that the low voltage side converter bridge is omitted. Instead, the resonant circuit is connected directly to a source of 3 phase AC voltage source. The converter retains all the good properties related to voltage stepping, power control and fault isolation discussed in connection with the preceding embodiments of the invention.

Figure 13A:
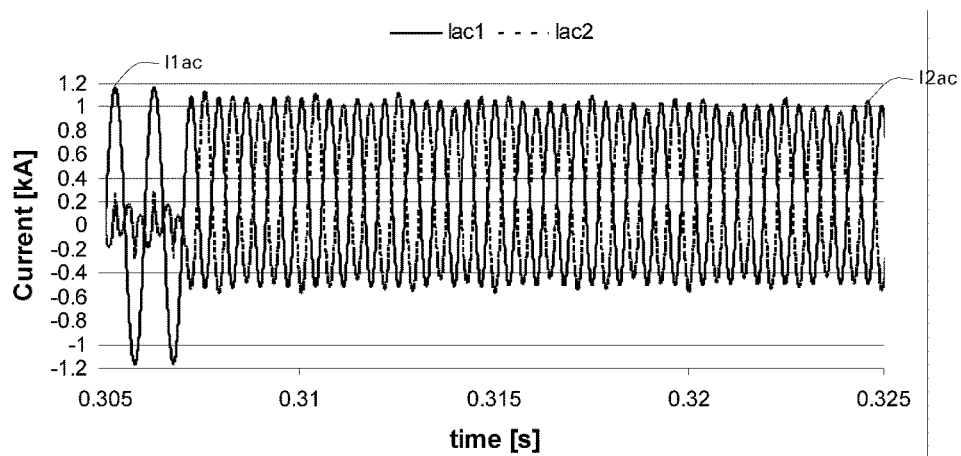
FIGS. 13a-13c illustrates the response of a PSCAD PSCAD/EMTDC simulation of a 2 terminal 2 phase DC/AC converter for a low impedance fault on 80 kV DC bus.
Figure 13B:
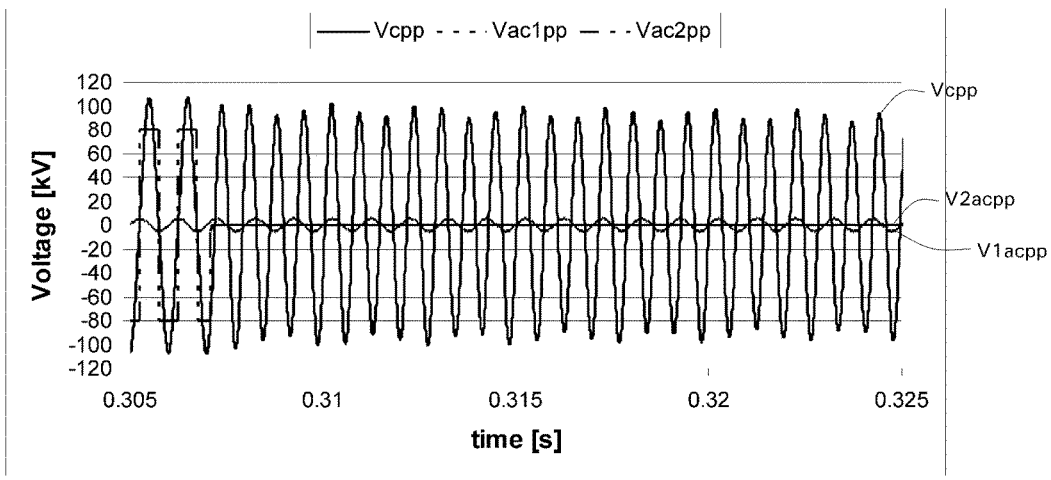
Figure 13C:
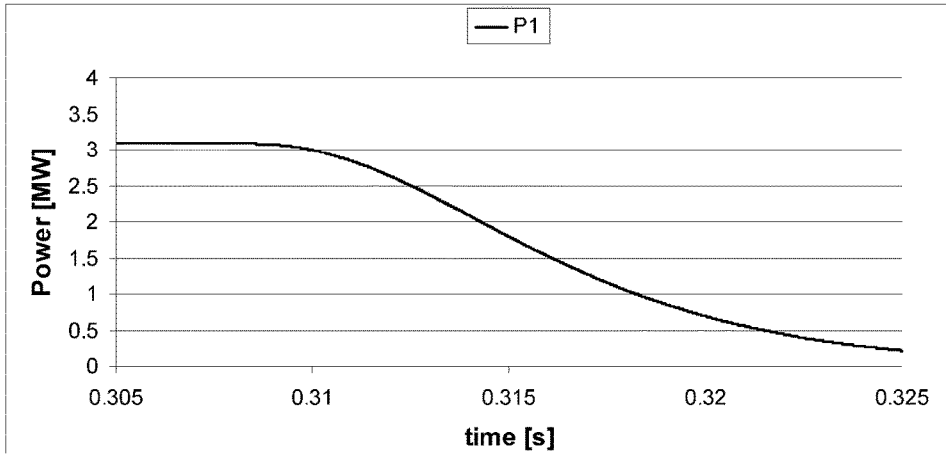

FIGS. 13a-13c show simulation responses for a converter which connects an AC system with a DC system. The test system is similar to that used to obtain the results of FIGS. 4a-4d, and uses the test parameters set out in tables 1a and 1b, except that the 4 kV converter is replaced by an AC source. This test system would correspond, for example, to an HVDC converter connecting to an AC grid. It can be seen that the converter transfers 3 MW and that voltage and current transformation is achieved in normal operation. The simulation imposes a severe DC fault on VAC2 at around 0.307 s. The converter can be seen to have a favourable reaction to the fault in that the power naturally reduces without any overcurrent or overvoltage, and the converter retains normal operation during the fault.

FIG. 12 shows a 3 phase, 2 terminal converter, which connects a low voltage AC system to a high voltage DC system.

However, in the general case, the converter may comprise m DC terminals, where m may be any positive integer. Moreover, the circuit may have p phases, where p is any positive integer.

Figure 14:
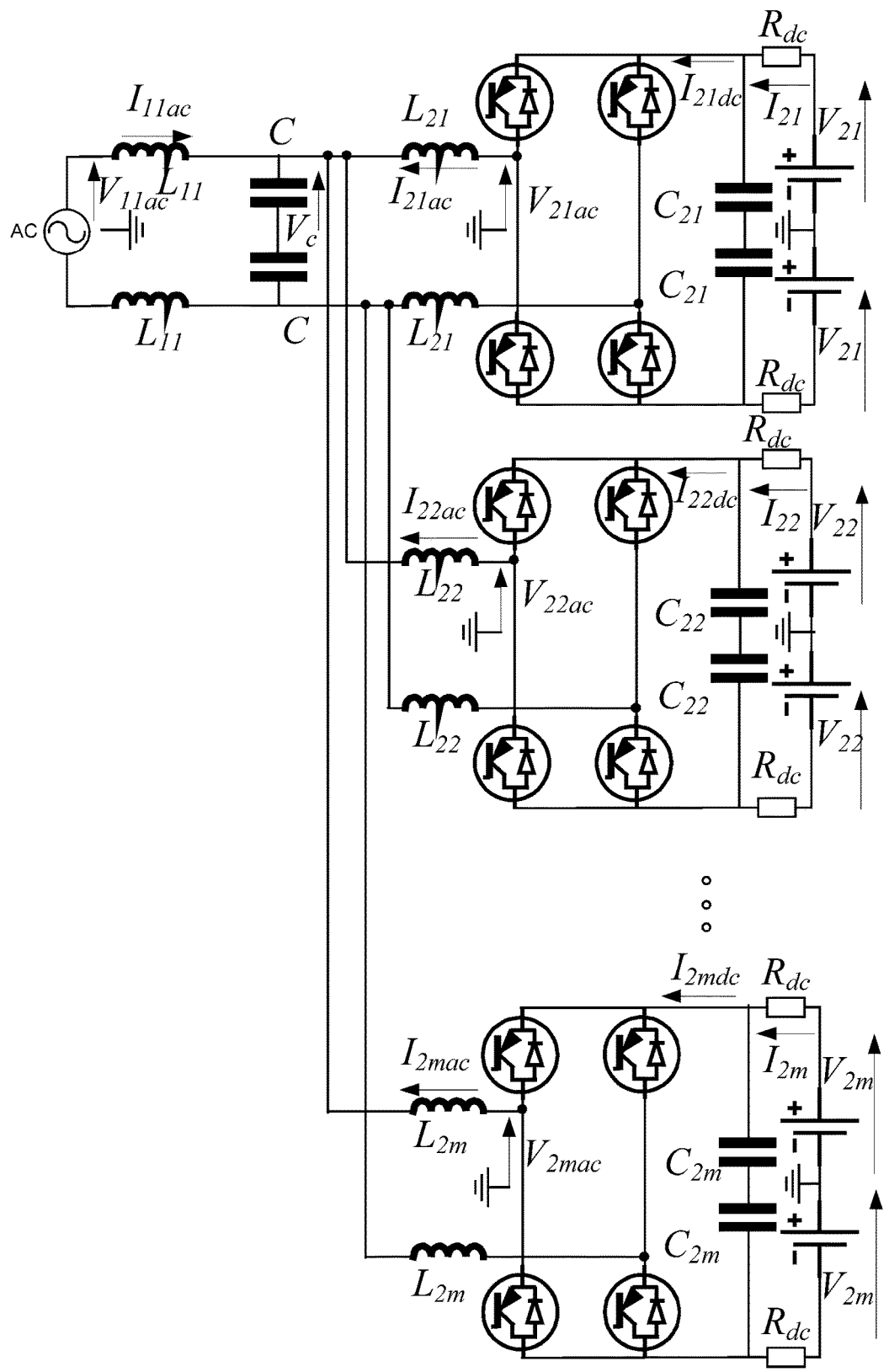
FIG. 14 shows a 2 phase DC/AC converter with 1 AC terminal and m DC terminals, which embodies the present invention.

FIG. 14 shows a 2 phase DC/AC converter which embodies the present invention. The converter shown in FIG. 12 is similar to that shown in FIG. 12, except that the converter transfers power between an AC system on one side and m DC systems on the other side. The converter retains all the good properties related to voltage stepping, power control and fault isolation discussed in connection with the preceding embodiments of the invention.

For clarity of explanation, the converters have been described as having a low voltage side and a high voltage side. However, it will be appreciated that, in certain circumstances, the voltage on both sides of the converter may be equal, such that the converter does not have a low voltage side and a high voltage side. However, it will be appreciated that the above descriptions above still apply in such circumstances, if the terms "low voltage" and "high voltage" are simply regarded as labels for the two sides of the converter.

The converter of the invention comprises control means or controller 100 shown for example in FIGS. 1a-1c and 12 for controlling AC voltage magnitude, frequency and phase. For example, one way of controlling these parameters is to generate a single square wave as illustrated in FIG. 2, and to vary the width of the square pulses to vary the AC voltage magnitude; the phase shift with respect to an arbitrary coordinate frame to achieve phase angle variation of the AC voltage; and the frequency of the square pulses to vary the frequency of the AC voltage. The square pulse can be achieved in many other ways, using direct square control on switches or phase difference between opposite switches. A multilevel converter or PWM converter is yet another possibility.

A suitable control circuit for the converter of the invention will be straightforward for a person skilled in the art to implement in view of what is disclosed herein.

REFERENCES

[1] Choi D. K. et al A novel power conversion circuit for cost effective battery fuel cell hybrid system. *Elsevier Journal of Power Sources* 152, 245-55 (2005)
[2] Heinemann L. Analysis and design of a modular, high power converter with high efficiency for electrical power distribution systems." *IEEE PESC* 2, 713-718 (2002)
[3] Jovcic D. Off Shore Wind Farm with a Series Multiterminal CSI HVDC. *Electric Power Systems Research, Elsevier* 78, issue 4, 747-55 (2008)
[4] Flourentzou N. et al VSC-Based HVDC Power Transmission Systems: An Overview. *IEEE Transactions on Power Electronics* 24, issue 3, 592-602
[5] Mohan N. et al Power Electronics Converters, Applications and Design. John Wiley & Sons, (1995)
[6] Zhao Q. et al High Efficiency, high step up DC-DC converters. *IEEE Transactions on Power Electronics*, 18, no. 1, 65-73 (2003)
[7] Hirachi K. et al Circuit configuration of bi-directional DC/DC converter specific for small scale load leveling system. *Proc IEE Power conversion conf,* 603-609 (2002)
[8] Abutbul, O. et al Step-up Switching Mode Converter With High Voltage Gain Using a Switched-Capacitor Circuit. *IEEE Transactions On Circuit and Systems-I* 50 no. 8, 1098-2002 (2003)
[9] U.S. Pat. No. 5,426,350
[10] Borage M. et al Analysis and design of LCL-T resonant converter as a constant-current power supply. *IEEE Trans. Industrial Electronics* 52, no. 6, 1547-54, (2005)
[11] Dieckerhoff S. et al "Design of an IGBT-based LCL-Resonant Inverter for High-Frequency Induction Heating." *IEEE Industry Applications Conf,* 34$^{th}$ *IAS Annual Meeting* 3, (1999)
[12] Uovcic D. Bidirectional high power DC transformer. *IEEE Transactions on Power Delivery* 24, issue 4, 2276-83 (2009)
[13] Uovcic D. Step-up DC-DC converter for MW size Applications. *IET Power Electronics* 2, issue 6, 675-685 (2009)
[14] WO 2010/029345 A1
[15] WO 2009/074820 A1
[16] Jovcic D. Phase Locked Loop System for FACTS. *IEEE Transactions on Power Syst* 18, no. 3, 1116-24 (2003)
[17] Manitoba HVDC Research Center PSCAD/EMTDC users' manual. *Winnipeg* (2003)

The invention claimed is:

1. A converter for transferring power between a p phase AC system of AC voltage $V_{1ac}$ of frequency $\omega$, root mean square line-neutral magnitude $V_{1acm}$, and m DC systems respectively of DC voltage $V_{2i}$ (i=1, 2, ... m), where m is any positive integer, the converter comprising:
   m AC/DC converters for respectively transforming DC voltages $V_{2i}$ into respective p phase AC voltages $V_{2iac}$, of frequency $\omega$, root mean square line-neutral magnitude $V_{2iacm}$ and angle $\alpha_{2j}$; and
   a LCL circuit for each p phase, wherein each LCL circuit comprises an inductor $L_1$, m inductors $L_{2j}$ and a capacitor C connected together at their first terminals, the second terminal of each inductor $L_1$ being connected to the respective phase of the respective AC voltage $V_{1ac}$, and the second terminal of each inductor $L_{2j}$ being connected to the respective phase of the respective AC voltage $V_{2jac}$, wherein the second terminals of all capacitors are connected to a common point;
   wherein the value of the capacitor C, inductor $L_1$ and each inductor $L_{2j}$ are selected to enable required power transfer and to
   minimise current in inductor $L_1$,
   and/or minimise currents in inductors $L_{2j}$.

2. A converter according to claim 1 wherein a difference between the AC voltage angles $\alpha_1, \alpha_2$ of substantially $$arctg\sqrt{\frac{1}{k_2k_1}-1} \text{ degrees and } -\frac{V_2}{V_1} < k_1 < 1$$

and where $k_2 = k_1(V_1/V_2)^2$ gives maximum power transfer in one direction and a difference between the AC voltage angles $\alpha_1, \alpha_2$ of substantially $$180 - arctg\sqrt{\frac{1}{k_2k_1}-1} \text{ degrees}$$

gives maximum power transfer in the opposite direction.

3. A converter according to claim 1 wherein p=1, such that the AC voltages $V_{1ac}$ and $V_{2ac}$ are single phase AC-voltages.

4. A converter according to claim 1 comprising control means for controlling power flow though the converter, wherein said control means comprises:
- means for varying AC voltage magnitude $V_{acm}$ by changing the width of the AC pulses;
- varying the angle difference between the AC sources $(\alpha_1-\alpha_2)$; and/or
- varying the operating frequency $\omega$ of the converter.

5. A converter according to claim 1 wherein p>1 and the second terminals of the capacitors for all phases are connected to a common point.

6. A converter for transferring power between a p phase AC system of AC voltage $V_{1ac}$ of frequency $\omega$, root mean square line-neutral magnitude $V_{1acm}$ and angle $\alpha_1$, and a DC system of DC voltage $V_2$, the converter comprising:
- an AC/DC converter for transforming DC voltage $V_2$ into a p phase AC voltage $V_{2ac}$, of frequency $\omega$, root mean square line-neutral magnitude $V_{2acm}$ and angle $\alpha_2$; and
- a LCL circuit for each p phase, wherein each LCL circuit comprises two inductors $L_1, L_2$ and a capacitor C connected together at their first terminals, the second terminal of inductor $L_1$ being connected to the respective phase of AC voltage $V_{1ac}$, and the second terminal of inductor $L_2$ being connected to the respective phase of AC voltage $V_{2ac}$, wherein the second terminals of all capacitors are connected to a common point;
- wherein the value of the capacitor C, inductor $L_1$ and inductor $L_2$ are selected to enable required power transfer and to
- minimise current in inductor $L_1$,
- and/or minimise current in inductor $L_2$.

7. A converter according to claim 6 wherein the value of the capacitor C, inductor $L_1$ and inductor $L_2$ are selected to satisfy the following relationships:

$$k_1 = 1-\omega^2 L_2 C \quad k_2 = 1-\omega^2 L_1 C$$

$$k_3 = L_1 + L_2 - \omega^2 L_1 L_2 C$$

and where $k_1$ is selected in the region:

$$-\frac{V_2}{V_1} < k_1 < 1$$

and where $$k_2 = k_1 (V_1/V_2)^2$$

$$k_3 = \frac{-p8V_1V_2\sqrt{1-(V_1/V_2)^2 k_1^2}}{P_{1ac}\omega\pi^2}$$

and where p represents the number of phases of AC voltage, s represents the stepping ratio, $V_1/V_2$, and $P_{1ac}$ represents maximum power transfer by the converter.

8. A converter according to claim 6 wherein a difference between the AC voltage angles $\alpha_1, \alpha_2$ of substantially $$arctg\sqrt{\frac{1}{k_2 k_1} - 1} \text{ degrees and } -\frac{V_2}{V_1} < k_1 < 1$$

and where $k_2 = k_1(V_1/V_2)^2$ gives maximum power transfer in one direction and a difference between the AC voltage angles $\alpha_1, \alpha_2$ of substantially $$180 - arctg\sqrt{\frac{1}{k_2 k_1} - 1} \text{ degrees}$$

gives maximum power transfer in the opposite direction.

9. A converter according to claim 6 wherein p=1, such that the AC voltages $V_{1ac}$ and $V_{2ac}$ are single phase AC-voltages.

10. A converter according to claim 6 comprising control means for controlling power flow though the converter, wherein said control means comprises: —
- means for varying AC voltage magnitude $V_{acm}$ by changing the width of the AC pulses;
- varying the angle difference between the AC sources $(\alpha_1-\alpha_2)$; and/or
- varying the operating frequency $\omega$ of the converter.

11. A converter according to claim 6 wherein p>1 and the second terminals of the capacitors for all phases are connected to a common point.

12. A converter for transferring power between a first DC system of DC voltage $V_1$ and a second DC system of DC voltage $V_2$, the converter comprising:
- a first AC/DC converter for transforming DC voltage $V_1$ into a first single phase AC voltage $V_{1ac}$, of frequency $\omega$, root mean square line-neutral magnitude $V_{1acm}$ and angle $\alpha_1$;
- a second AC/DC converter for transforming DC voltage $V_2$ into a second single phase AC voltage $V_{2ac}$, of frequency $\omega$, root mean square line-neutral magnitude $V_{2acm}$ and angle $\alpha_2$; and
- two inductors $L_1, L_2$ and a capacitor C, wherein the first terminals of the inductors and capacitor are connected together, the second terminal of inductor $L_1$ and the second terminal of the capacitor C are connected to the first AC voltage $V_{1ac}$, and the second terminal of inductor $L_2$ and the second terminal of the capacitor C are connected to the second AC voltage $V_{2ac}$;
- wherein the value of the capacitor C, inductor L1 and inductor L2 are selected to enable required power transfer and to
- minimise current in inductor L1,
- and/or minimise current in inductor L2.

13. A converter according to claim 12 wherein the value of the capacitor C, inductor L1 and inductor L2 are selected to satisfy the following relationships:

$$k_1 = 1-\omega^2 L_2 C$$

$$k_2 = 1-\omega^2 L_1 C$$

$$k_3 = L_1 + L_2 - \omega^2 L_1 L_2 C$$

and where $k_1$ is selected in the region:

$$-\frac{V_2}{V_1} < k_1 < 1$$

and where $$k_2 = k_1 s^2$$

$$k_3 = \frac{-p8V_1V_2\sqrt{1-(V_1/V_2)^2 k_1^2}}{P_{1ac}\omega\pi^2}$$

and where p represents the number of phases of AC voltage, s represents the stepping ratio, $V_1/V_2$, and $P_{1ac}$ represents maximum power transfer by the converter.

14. A converter according to claim 13 comprising control means for controlling power flow though the converter, wherein said control means comprises:
   means for varying AC voltage magnitude by changing the width of the AC pulses;
   varying the angle difference between the AC sources ($\alpha_1-\alpha_2$); and/or
   varying the operating frequency $\omega$ of the converter.

15. A converter according to claim 13 wherein a difference between the AC voltage angles $\alpha_1, \alpha_2$ of substantially $$arctg\sqrt{\frac{1}{k_2k_1}-1} \text{ degrees and } -\frac{V_2}{V_1} < k_1 < 1$$

and where $k_2=k_1(V_1/V_2)^2$ gives maximum power transfer in one direction and a difference between the AC voltage angles $\alpha_1, \alpha_2$ of substantially $$180-arctg\sqrt{\frac{1}{k_2k_1}-1} \text{ degrees}$$

gives maximum power transfer in the opposite direction.

16. A converter for transferring power between a first DC system of DC voltage $V_1$ and a second DC system of DC voltage $V_2$, the converter comprising:
   a first AC/DC converter for transforming DC voltage $V_1$ into a first p phase AC voltage $V_{1ac}$ of frequency $\omega$, root mean square line-neutral magnitude $V_{1acm}$ and angle $\alpha_1$;
   a second AC/DC converter for transforming DC voltage $V_2$ into a second p phase AC voltage $V_{2ac}$, of frequency $\omega$, root mean square line-neutral magnitude $V_{2acm}$ and angle $\alpha_2$; and a LCL circuit for each p phase, wherein each LCL circuit comprises two inductors $L_1, L_2$ and a capacitor C connected together at their first terminals, the second terminal of inductor $L_1$ being connected to the respective phase of the first AC voltage $V_{1ac}$, and the second terminal of inductor $L_2$ being connected to the respective phase of the second AC voltage $V_{2ac}$, wherein the second terminals of all capacitors are connected to a common point;
   wherein the value of the capacitor C, inductor L1 and inductor L2 are selected to enable required power transfer and to
   minimise current in inductor L1,
   and/or minimise current in inductor L2.

17. A converter according to claim 16 wherein a difference between the AC voltage angles $\alpha_1, \alpha_2$ of substantially $$arctg\sqrt{\frac{1}{k_2k_1}-1} \text{ degrees and } -\frac{V_2}{V_1} < k_1 < 1$$

and where $k_2=k_1(V_1/V_2)^2$ gives maximum power transfer in one direction and a difference between the AC voltage angles $\alpha_1, \alpha_2$ of substantially $$180-arctg\sqrt{\frac{1}{k_2k_1}-1} \text{ degrees}$$

gives maximum power transfer in the opposite direction.

18. A converter according to claim 16 wherein p=1, such that the AC voltages $V_{1ac}$ and $V_{2ac}$ are single phase AC-voltages.

19. A converter according to claim 16 comprising control means for controlling power flow though the converter, wherein said control means comprises:
   means for varying AC voltage magnitude $V_{acm}$ by changing the width of the AC pulses;
   varying the angle difference between the AC sources ($\alpha_1-\alpha_2$); and/or
   varying the operating frequency $\omega$ of the converter.

20. A converter according to claim 16 wherein p>1 and the second terminals of the capacitors for all phases are connected to a common point.

21. A converter according to claim 16 wherein the value of the capacitor C, inductor L1 and inductor L2 are selected to satisfy the following relationships:

$$k_1=1-\omega^2L_2C \quad k_2=1-\omega^2L_1C$$

$$k_3=L_1+L_2-\omega^2L_1L_2C$$

and where $k_1$ is selected in the region:

$$-\frac{V_2}{V_1} < k_1 < 1$$

and where $$k_2 = k_1s^2$$

$$k_3 = \frac{-p8V_1V_2\sqrt{1-(V_1/V_2)^2k_1^2}}{P_{1ac}\omega\pi^2}$$

and where p represents the number of phases of AC voltage, s represents the stepping ratio, $V_1/V_2$, and $P_{1ac}$ represents maximum power transfer by the converter.

22. A converter for transferring power between n DC systems respectively of DC voltage $V_{1i}$(i=1, 2, ... n) and m DC systems respectively of DC voltage $V_{2j}$(j=1, 2, ... m), where n and m are both any positive integer, the converter comprising:
   n AC/DC converters for respectively transforming DC voltages $V_{1i}$ into respective p phase AC voltages $V_{1iac}$ of frequency $\omega$, root mean square line-neutral magnitude $V_{1iacm}$ and angle $\alpha_{1i}$;
   m AC/DC converters for respectively transforming DC voltages $V_{2j}$ into respective p phase AC voltages $V_{2jac}$, of frequency $\omega$, root mean square line-neutral magnitude $V_{2jacm}$ and angle $\alpha_{2j}$; and
   a LCL circuit for each p phase, wherein each LCL circuit comprises n inductors $L_{1i}$, m inductors $L_{2j}$ and a capacitor C connected together at their first terminals, the second terminal of each inductor $L_{1i}$ being connected to the respective phase of the respective AC voltage $V_{1iac}$, and the second terminal of each inductor $L_{2j}$ being connected to the respective phase of the respective AC voltage $V_{2jac}$, wherein the second terminals of all capacitors are connected to a common point;
   wherein the value of the capacitor C, each inductor $L_{1i}$ and each inductor $L_{2j}$ are selected to enable required power transfer and to
   minimise current in inductors $L_{1i}$,
   and/or minimise currents in inductors $L_{2j}$.

23. A converter according to claim 22 wherein p=1, such that the AC voltages $V_{1ac}$ and $V_{2ac}$ are single phase AC-voltages.

24. A converter according to claim 22 comprising control means for controlling power flow though the converter, wherein said control means comprises:
- means for varying AC voltage magnitude $V_{acm}$ by changing the width of the AC pulses;
- varying the angle difference between the AC sources $(\alpha_1 - \alpha_2)$; and/or
- varying the operating frequency $\omega$ of the converter.

25. A converter according to claim 22 wherein p>1 and the second terminals of the capacitors for all phases are connected to a common point.

26. A converter according to claim 22 wherein a difference between the AC voltage angles $\alpha_1, \alpha_2$ of substantially $$arctg\sqrt{\frac{1}{k_2 k_1} - 1} \text{ degrees and } -\frac{V_2}{V_1} < k_1 < 1$$

and where $k_2 = k_1 (V_1/V_2)^2$ gives maximum power transfer in one direction and a difference between the AC voltage angles $\alpha_1, \alpha_2$ of substantially $$180 - arctg\sqrt{\frac{1}{k_2 k_1} - 1} \text{ degrees}$$

gives maximum power transfer in the opposite direction.

* * * * *